US010598938B1

(12) United States Patent
Huang et al.

(10) Patent No.: US 10,598,938 B1
(45) Date of Patent: Mar. 24, 2020

(54) ANGULAR SELECTIVE GRATING COUPLER FOR WAVEGUIDE DISPLAY

(71) Applicant: Facebook Technologies, LLC, Menlo Park, CA (US)

(72) Inventors: Ningfeng Huang, Redmond, WA (US); Hee Yoon Lee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/186,120

(22) Filed: Nov. 9, 2018

(51) Int. Cl.
*G02B 27/01* (2006.01)
*G02B 6/34* (2006.01)
*G02B 6/124* (2006.01)
*G02B 6/42* (2006.01)

(52) U.S. Cl.
CPC ......... *G02B 27/0172* (2013.01); *G02B 6/124* (2013.01); *G02B 6/34* (2013.01); *G02B 6/4214* (2013.01); *G02B 2027/0178* (2013.01)

(58) Field of Classification Search
CPC ....................................................... G02B 6/34
See application file for complete search history.

(56) References Cited

U.S. PATENT DOCUMENTS

| 10,267,970 | B2 * | 4/2019 | Jones, Jr. | ............ | G02B 6/0035 |
| 2015/0036991 | A1 * | 2/2015 | Lai | ........................ | G02B 6/124 |
| | | | | | 385/132 |
| 2017/0082800 | A1 * | 3/2017 | Kong | ..................... | G02B 6/124 |
| 2018/0052276 | A1 * | 2/2018 | Klienman | ............ | G02B 6/0035 |
| 2018/0059297 | A1 * | 3/2018 | Peroz | ................... | G02B 6/0035 |
| 2018/0059304 | A1 * | 3/2018 | Bhargava | ............ | G02B 6/0035 |
| 2018/0232048 | A1 * | 8/2018 | Popovich | ............... | A61B 3/113 |
| 2019/0129089 | A1 * | 5/2019 | Mohanty | ............. | G02B 6/0065 |
| 2019/0129180 | A1 * | 5/2019 | Mohanty | ........... | G02B 27/0172 |

* cited by examiner

*Primary Examiner* — Sung H Pak
(74) *Attorney, Agent, or Firm* — Kilpatrick Townsend & Stockton LLP

(57) ABSTRACT

An optical coupler for a waveguide-based display includes a slanted surface-relief grating that includes a plurality of regions. Different regions of the plurality of regions of the slanted surface-relief grating have different angular selectivity characteristics for incident display light. Display light for different viewing angles is diffracted by different regions of the slanted surface-relief grating.

20 Claims, 15 Drawing Sheets

ANGULAR SELECTIVE GRATING COUPLER FOR WAVEGUIDE DISPLAY

BACKGROUND

An artificial reality system, such as a head-mounted display (HMD) or heads-up display (HUD) system, generally includes a near-eye display (e.g., a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example optical see-through AR system may use a waveguide-based optical display, where light of projected images may be coupled into a waveguide (e.g., a substrate), propagate within the waveguide, and be coupled out of the waveguide at different locations. In some implementations, the light may be coupled out of the waveguide using a diffractive optical element, such as a grating. As any other mobile electronic device, it is generally desirable that the efficiency of the waveguide-based optical display be as high as possible.

SUMMARY

This disclosure relates generally to techniques for artificial reality system, and more specifically, to a waveguide-based near-eye display system. According to certain embodiments, an optical coupler for a waveguide-based near-eye display may include a grating coupler (e.g., a slanted surface-relief grating) that includes multiple regions (e.g., with a width for each region in the range of about 10 micrometers to about 1 millimeter), where different regions of the grating coupler may have different angular selectivity characteristics (constructive interference conditions) for the incident display light such that, at any region of the waveguide-based near-eye display, diffraction light that would not eventually reach user's eyes may be suppressed (i.e., may not be diffracted by the grating coupler so as to be coupled into or out of the waveguide), and only light that may eventually reach the user's eyes may be diffracted by the grating coupler and be coupled into or out of the waveguide. In this way, the overall power efficiency of the near-eye display system may be significantly improved.

In some embodiments, an optical coupler for a waveguide-based display may include a slanted surface-relief grating that includes a plurality of regions, where different regions of the plurality of regions of the slanted surface-relief grating may have different angular selectivity characteristics for incident display light, and display light for different viewing angles may be diffracted by different regions of the slanted surface-relief grating. In some embodiments, different regions of the plurality of regions of the slanted surface-relief grating may have at least one of different grating duty cycles, different slant angles, or different refractive indexes.

In some embodiments, the slanted surface-relief grating may include an overcoat layer filling gaps in the slanted surface-relief grating, and different regions of the plurality of regions of the slanted surface-relief grating may have different refractive indexes in the overcoat layer. In some embodiments, the overcoat layer may include different materials or a same material with different doping at different regions of the slanted surface-relief grating. In some embodiments, a difference between a refractive index of the overcoat layer and a refractive index of the slanted surface-relief grating may be equal to or greater than 0.2.

In some embodiments, the slanted surface-relief grating may be configured to couple display light out of a waveguide of the waveguide-based display. The display light diffracted by different regions of the slanted surface-relief grating out of the waveguide may propagate at different directions towards an eyebox of the waveguide-based display. In some embodiments, an area of the eyebox may be less than one fifth of an output area of the waveguide-based display.

In some embodiments, each region of the plurality of regions of the slanted surface-relief grating may be configured to couple display light for a respective field of view into a waveguide of the waveguide-based display and prevent the coupled display light for other fields of view from being coupled out of the waveguide by the slanted surface-relief grating. The display light diffracted by different regions of the slanted surface-relief grating into the waveguide may propagate at different directions within the waveguide.

In some embodiments, the slanted surface-relief grating may be formed on a front or back surface of the waveguide-based display. In some embodiments, a width of each of the plurality of regions is between 10 micrometers and 1 millimeter. In some embodiments, the display light diffracted by each region of the slanted surface-relief grating may have an angular range greater than 10°. In some embodiments, a slant angle of the slanted surface-relief grating may be greater than 30°.

According to certain embodiments, a waveguide-based near-eye display may include a substrate and an output coupler including a slanted surface-relief grating formed on a surface of the substrate. The slanted surface-relief grating may include a plurality of regions. Different regions of the plurality of regions of the slanted surface-relief grating may have different angular selectivity characteristics for incident display light. Display light diffracted by different regions of the slanted surface-relief grating may propagate at different directions towards an eyebox of the waveguide-based near-eye display.

In some embodiments of the waveguide-based near-eye display, different regions of the plurality of regions of the slanted surface-relief grating may have different grating duty cycles that range from 5% to 95%, and a depth of the slanted surface-relief grating may be greater than a threshold value. In some embodiments, the threshold may be greater than a half of a grating period of the slanted surface-relief grating.

In some embodiments, the slanted surface-relief grating may include an overcoat layer filling gaps in the slanted surface-relief grating. Different regions of the plurality of regions of the slanted surface-relief grating may have different refractive indexes in the overcoat layer. In some embodiments, a difference between a refractive index of the overcoat layer and a refractive index of the slanted surface-relief grating may be equal to or greater than 0.2.

In some embodiments, the display light diffracted by each region of the slanted surface-relief grating may have an angular range greater than 10°.

In some embodiments, the waveguide-based near-eye display may also include a light source, and an input coupler formed on the substrate and configured to couple display light from the light source into the substrate. The input coupler may include a plurality of regions having different angular selectivity characteristics. Each region of the input coupler may be configured to couple display light within a respective angular range into the substrate.

According to certain embodiments, a method of displaying images using a waveguide-based near-eye display may include diffracting, by a first region of a slanted grating coupler, only a first portion of display light out of a waveguide, where the first portion of display light may propagate at angles within a first angular range towards an eyebox of the waveguide-based near-eye display. The method may also include diffracting, by a second region of the slanted grating coupler, only a second portion of display light out of the waveguide, where the second portion of display light may propagate at angles within a second angular range towards the eyebox of the waveguide-based near-eye display, and the second angular range is different from the first angular range. In some embodiments, the first region and the second region of the slanted grating coupler have different duty cycles, slant angles, or refractive index modulations.

In some embodiments, an optical coupler for a waveguide-based display may include a slanted surface-relief grating that includes a plurality of regions, where different regions of the plurality of regions of the slanted surface-relief grating may have different angular selectivity characteristics for incident display light, and display light for different viewing angles may be diffracted by different regions of the slanted surface-relief grating. In some embodiments, different regions of the plurality of regions of the slanted surface-relief grating may have at least one of different grating duty cycles, different slant angles, or different refractive indexes.

In some embodiments, the slanted surface-relief grating may include an overcoat layer filling gaps in the slanted surface-relief grating, and different regions of the plurality of regions of the slanted surface-relief grating may have different refractive indexes in the overcoat layer. In some embodiments, the overcoat layer may include different materials or a same material with different doping at different regions of the slanted surface-relief grating. In some embodiments, a difference between a refractive index of the overcoat layer and a refractive index of the slanted surface-relief grating may be equal to or greater than 0.2.

In some embodiments, the slanted surface-relief grating may be configured to couple display light out of a waveguide of the waveguide-based display. The display light diffracted by different regions of the slanted surface-relief grating out of the waveguide may propagate at different directions towards an eyebox of the waveguide-based display. In some embodiments, an area of the eyebox may be less than one fifth of an output area of the waveguide-based display.

In some embodiments, each region of the plurality of regions of the slanted surface-relief grating may be configured to couple display light for a respective field of view into a waveguide of the waveguide-based display and prevent the coupled display light for other fields of view from being coupled out of the waveguide by the slanted surface-relief grating. The display light diffracted by different regions of the slanted surface-relief grating into the waveguide may propagate at different directions within the waveguide.

In some embodiments, the slanted surface-relief grating may be formed on a front or back surface of the waveguide-based display. In some embodiments, a width of each of the plurality of regions is between 10 micrometers and 1 millimeter. In some embodiments, the display light diffracted by each region of the slanted surface-relief grating may have an angular range greater than 10°. In some embodiments, a slant angle of the slanted surface-relief grating may be greater than 30°.

According to certain embodiments, a waveguide-based near-eye display may include a substrate and an output coupler including a slanted surface-relief grating formed on a surface of the substrate. The slanted surface-relief grating may include a plurality of regions. Different regions of the plurality of regions of the slanted surface-relief grating may have different angular selectivity characteristics for incident display light. Display light diffracted by different regions of the slanted surface-relief grating may propagate at different directions towards an eyebox of the waveguide-based near-eye display.

In some embodiments of the waveguide-based near-eye display, different regions of the plurality of regions of the slanted surface-relief grating may have different grating duty cycles that range from 5% to 95%, and a depth of the slanted surface-relief grating may be greater than a threshold value. In some embodiments, the threshold may be greater than a half of a grating period of the slanted surface-relief grating.

In some embodiments, the slanted surface-relief grating may include an overcoat layer filling gaps in the slanted surface-relief grating. Different regions of the plurality of regions of the slanted surface-relief grating may have different refractive indexes in the overcoat layer. In some embodiments, a difference between a refractive index of the overcoat layer and a refractive index of the slanted surface-relief grating may be equal to or greater than 0.2.

In some embodiments, the display light diffracted by each region of the slanted surface-relief grating may have an angular range greater than 10°.

In some embodiments, the waveguide-based near-eye display may also include a light source, and an input coupler formed on the substrate and configured to couple display light from the light source into the substrate. The input coupler may include a plurality of regions having different angular selectivity characteristics. Each region of the input coupler may be configured to couple display light within a respective angular range into the substrate.

According to certain embodiments, a method of displaying images using a waveguide-based near-eye display may include diffracting, by a first region of a slanted grating coupler, only a first portion of display light out of a waveguide, where the first portion of display light may propagate at angles within a first angular range towards an eyebox of the waveguide-based near-eye display. The method may also include diffracting, by a second region of the slanted grating coupler, only a second portion of display light out of the waveguide, where the second portion of display light may propagate at angles within a second angular range towards the eyebox of the waveguide-based near-eye display, and the second angular range is different from the first angular range. In some embodiments, the first region and the second region of the slanted grating coupler have different duty cycles, slant angles, or refractive index modulations.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
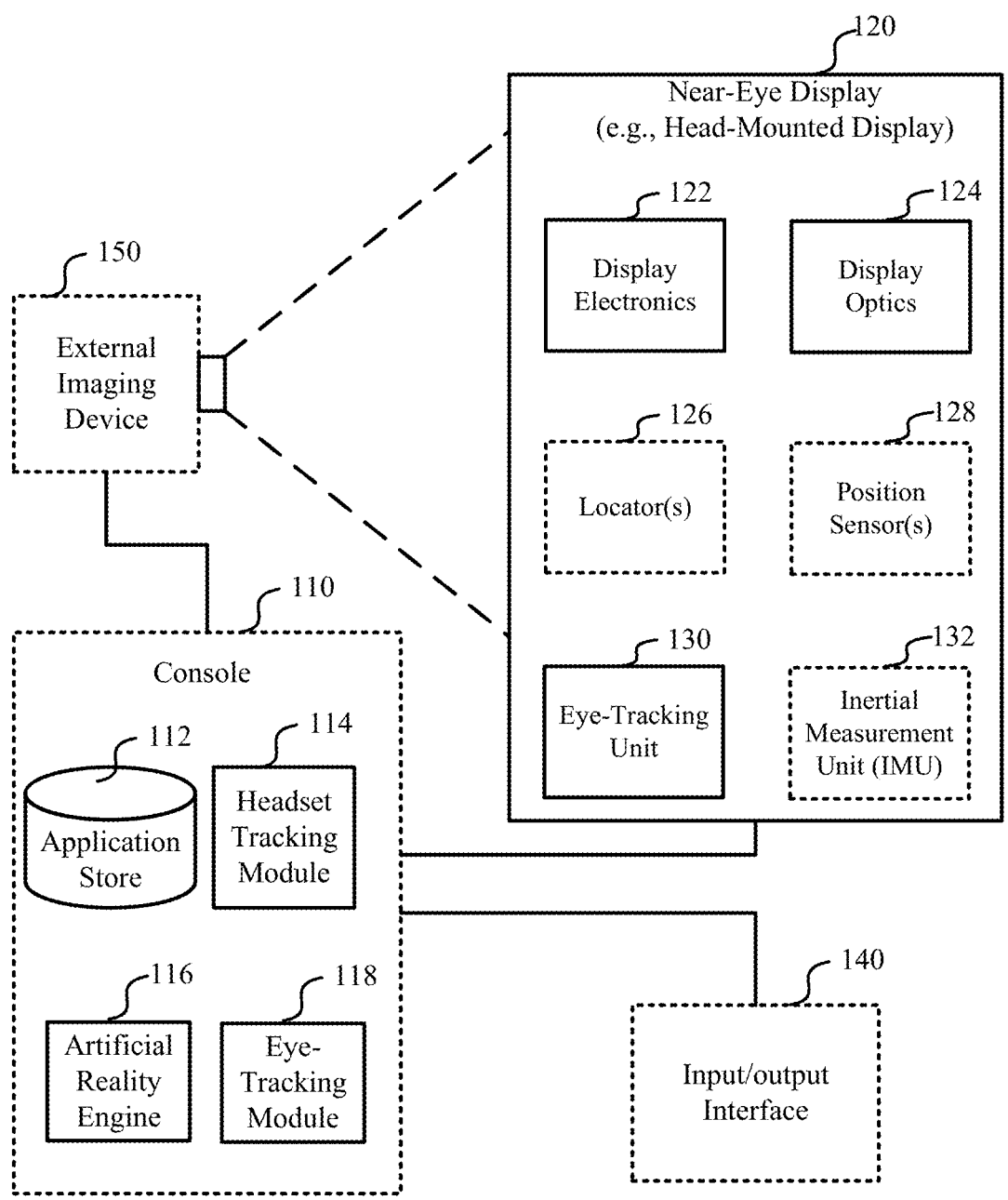
FIG. 1 is a simplified block diagram of an example artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to an artificial reality system, and more specifically, to a waveguide-based near-eye display system. In a waveguide-based near-eye display system, the output area of the waveguide is usually much larger than the size of the eyebox of the near-eye display system. Thus, if the display light for all fields of view is uniformly output from any region of the waveguide, the portion of light that may reach a user's eyes may depend on the ratio between the size of the eyebox and the output area of the waveguide, which may be less than, for example 10% for a certain eye relief and field of view.

According to certain embodiments, an optical coupler for a waveguide-based display may include a grating coupler (e.g., a slanted surface-relief grating or other diffractive gratings) that may include multiple regions (e.g., with a width for each region in the range of about 10 micrometers to about 1 millimeter), where different regions of the grating coupler may have different angular selectivity characteristics (constructive interference conditions) for the incident display light such that diffraction light that would not eventually propagate towards the eyebox of the near-eye display system may be suppressed (i.e., may not be diffracted by the grating into or out of the waveguide). In this way, light from different fields of view (or viewing angles) may be coupled into or out of the waveguide at different regions of the waveguide, and, at any given region, only light that may eventually reach the eyebox may be coupled into or out of the waveguide, while other display light in the waveguide may continue to propagate within the waveguide until it is coupled out of the waveguide at a region of the grating coupler where the display light meets the corresponding angular selectivity condition at the region of the grating coupler. Therefore, most of the display light from different fields of view may reach the user's eyes, and the efficiency of the waveguide-based display may thus be significantly improved.

The different angular selectivity characteristics of the grating coupler may be achieved by different grating configurations (and thus different effective optical path length over a grating period) of the grating coupler at different regions. The different configurations may include, for example, different duty cycles (a ratio between the width of a grating ridge and the grating period), different refractive indexes, different slant angles, different periods, or any combination thereof, at different regions of the slanted surface-relief grating. There may be many different ways to manufacture grating couplers with varying configurations (e.g., duty cycles or refractive index modulations) over the full region of the grating coupler. For example, a slanted surface-relief grating coupler with a varying duty cycle (e.g., from about 5% to about 95%) may be fabricated using various lithography and etching techniques, such as ion beam etch (IBE), reactive ion beam etch (RIBE), or chemically assisted ion beam etch (CAIBE) process, or other pattern transfer techniques. The different refractive index modulations can be achieved by, for example, varying the overcoat material for the slanted surface-relief grating or changing the doping in the overcoat layer at different regions of the grating coupler.

In grating couplers including slanted surface-relief gratings, a large refractive index variation (e.g., >0.2) between the grating ridge and grating groove region in a grating period can be achieved. Thus, a large angular bandwidth (e.g., >10°) may be achieved to provide a sufficiently large eyebox for the waveguide-based display system. In addition, because of the large refractive index variation, the angular selectivity can be achieved by the constructive interference between a small number (e.g., two or more) of grating periods, and thus the depth of the slanted surface-relief grating can be small (e.g., a thinner grating).

The slanted surface-relief grating with a varying angular selectivity can be positioned on either the side of the waveguide closer to the user's eyes or the side of the waveguide further from the user's eyes. The same techniques can also be used for an optical input coupler in the waveguide-based display.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example artificial reality system environment 100 including a near-eye display 120 in accordance with certain embodiments. Artificial reality system environment 100 shown in FIG. 1 may include near-eye display 120, an optional external imaging device 150, and an optional input/output interface 140 that may each be coupled to an optional console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to FIGS. 2, 3, and 20. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, a micro light emitting diode (mLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
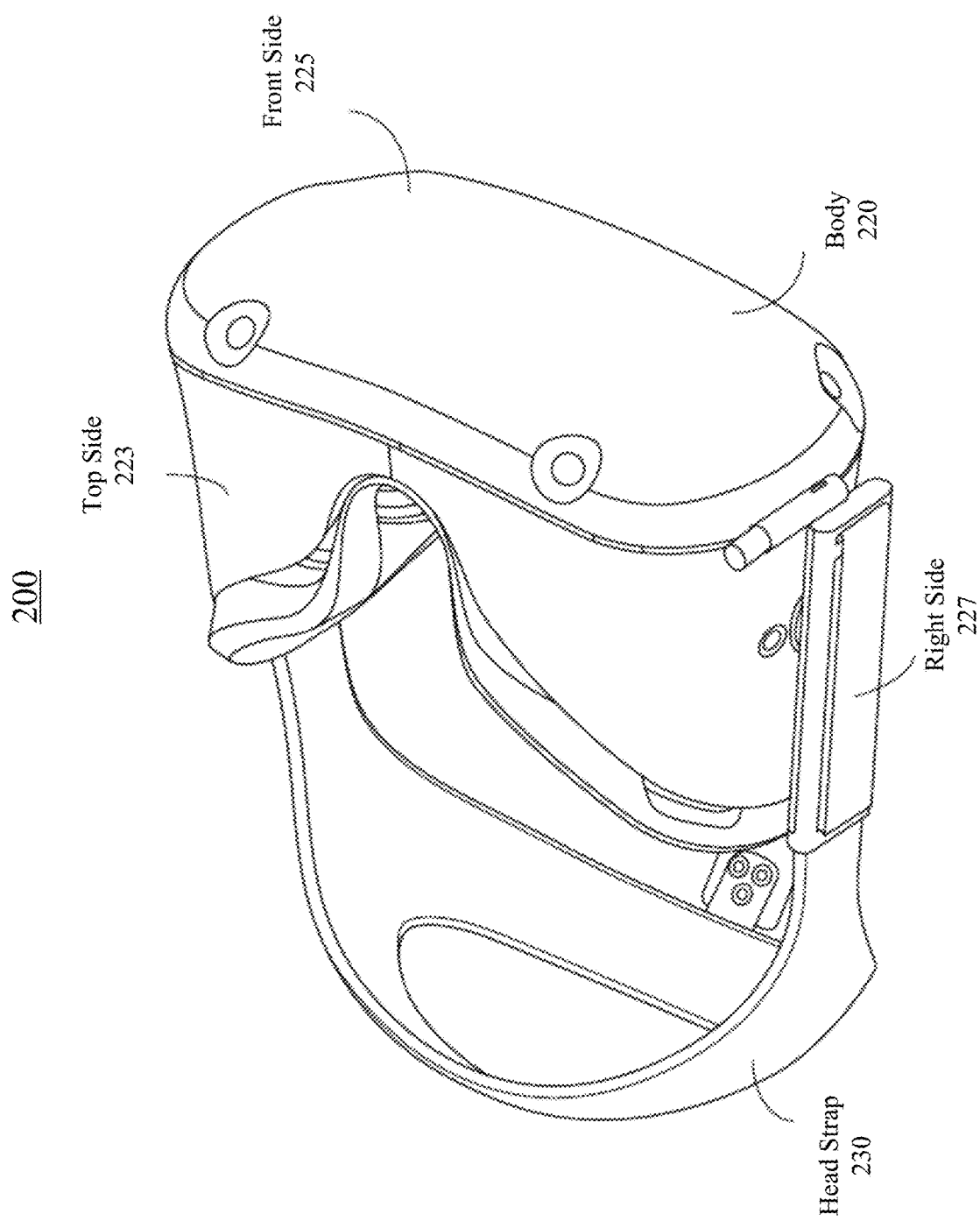
FIG. 2 is a perspective view of an example near-eye display in the form of a head-mounted display (HMD) device for implementing some of the examples disclosed herein.

FIG. 2 is a perspective view of an example near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
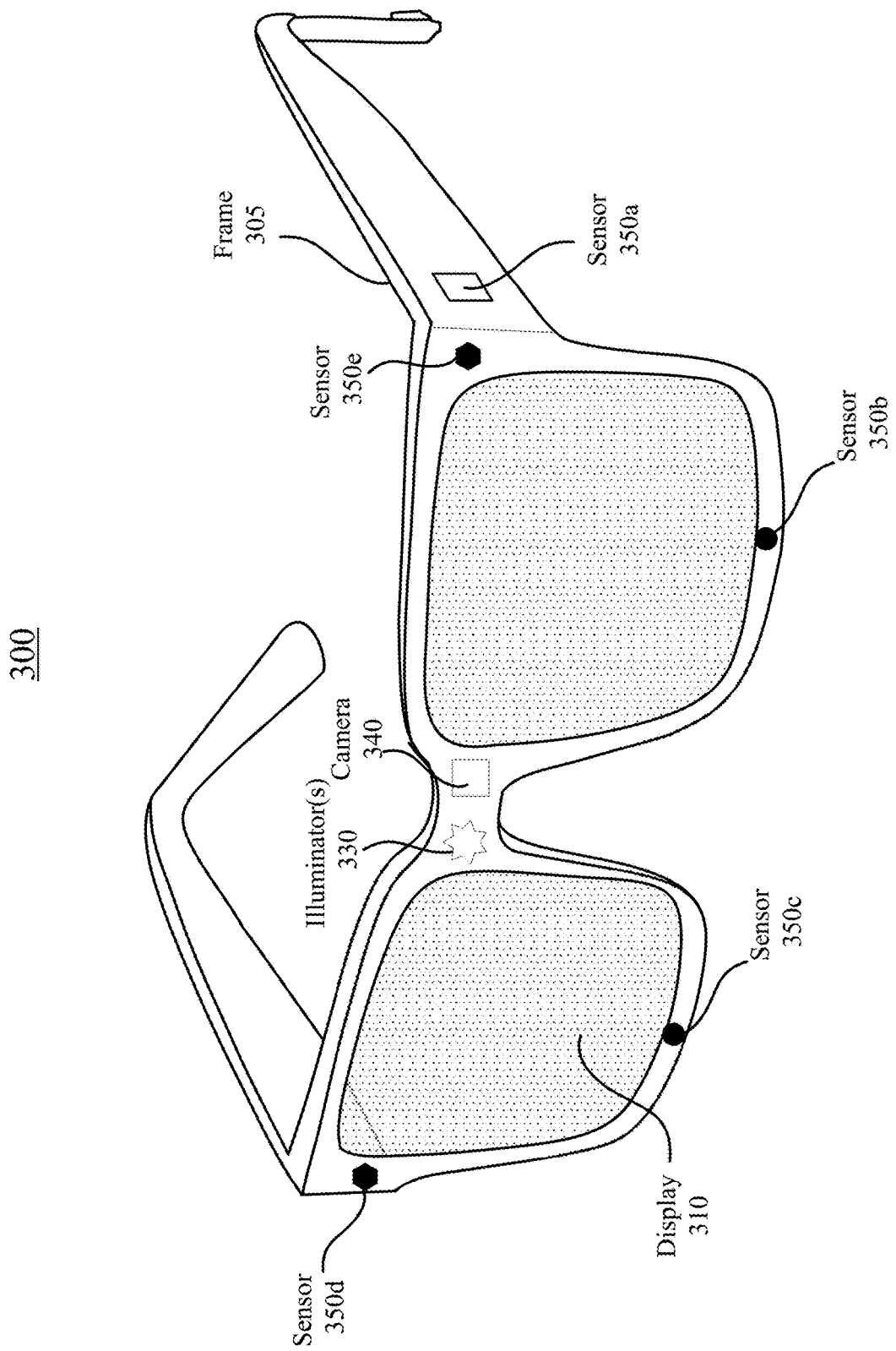
FIG. 3 is a perspective view of a simplified example near-eye display in the form of a pair of glasses for implementing some of the examples disclosed herein.

FIG. 3 is a perspective view of a simplified example near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
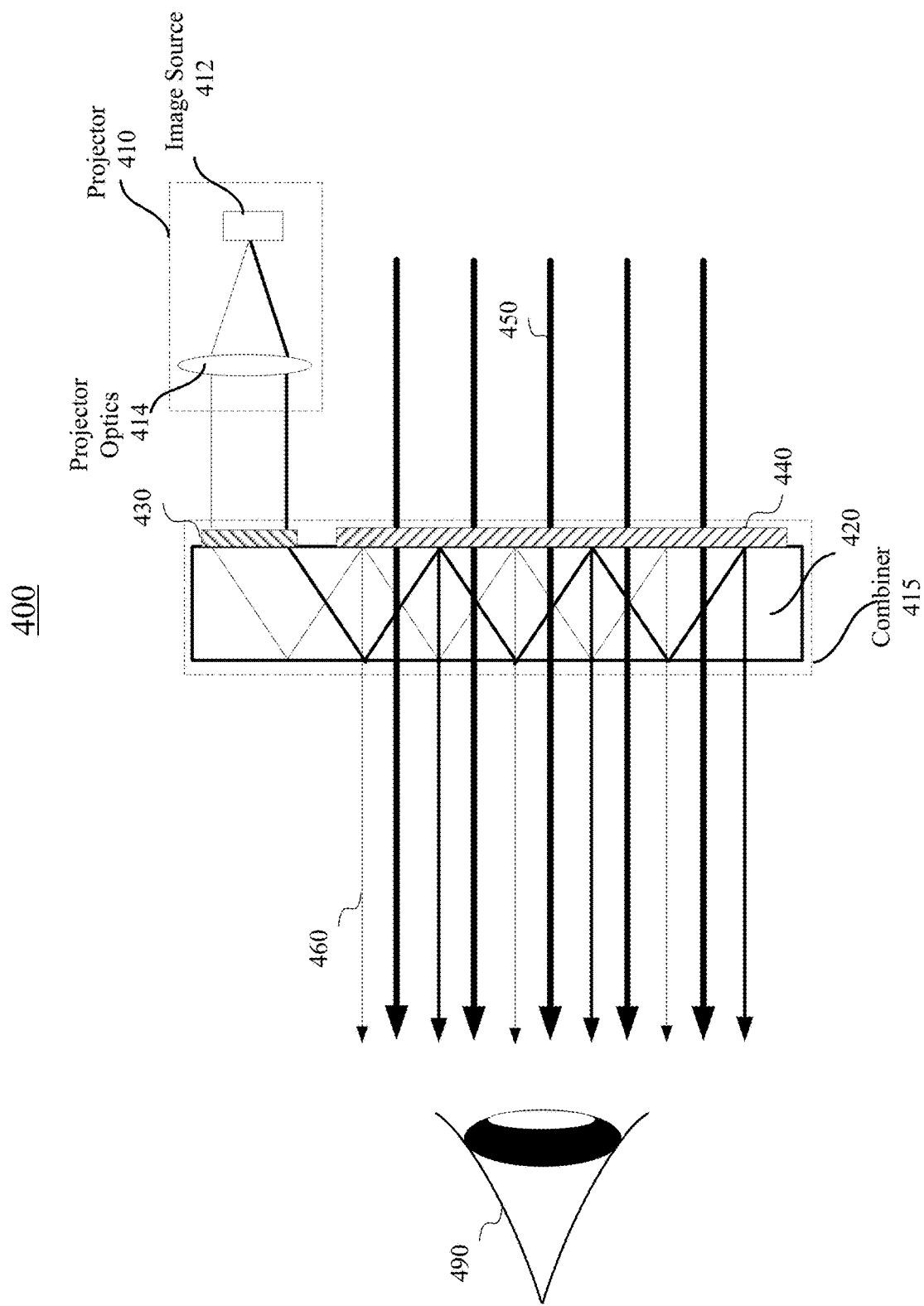
FIG. 4 illustrates an example optical see-through augmented reality system using a waveguide display according to certain embodiments.

FIG. 4 illustrates an example optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
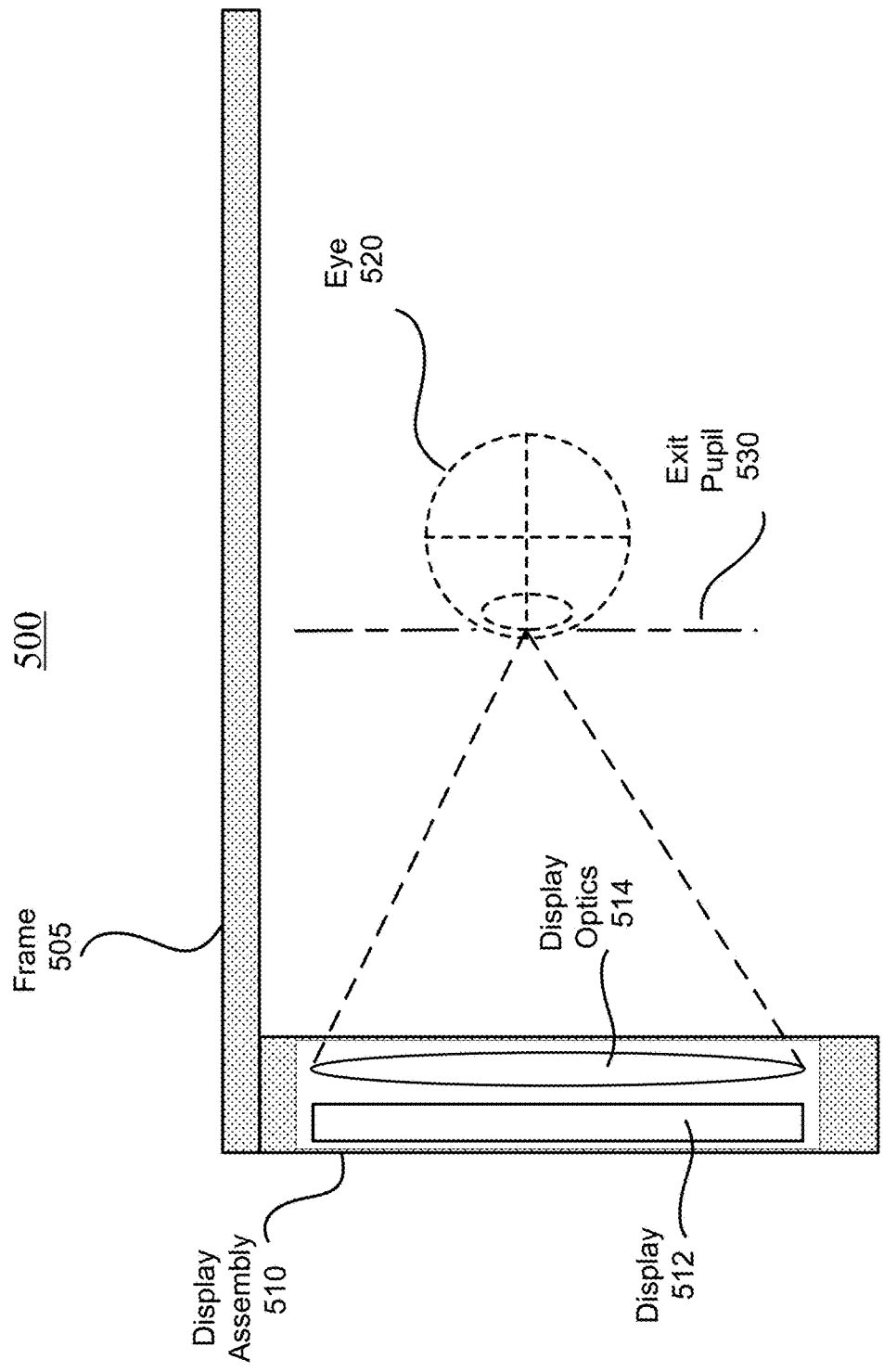
FIG. 5 is a cross-sectional view of an example near-eye display according to certain embodiments.

FIG. 5 is a cross-sectional view of an example near-eye display 500 according to certain embodiments. Near-eye display 500 may include at least one display assembly 510. Display assembly 510 may be configured to direct image light (i.e., display light) to an eyebox located at exit pupil 530 and to user's eye 520. It is noted that, even though FIG. 5 and other figures in the present disclosure show an eye of a user of a near-eye display for illustration purposes, the eye of the user is not a part of the corresponding near-eye display.

As HMD device 200 and near-eye display 300, near-eye display 500 may include a frame 505 and a display assembly 510 that includes a display 512 and/or display optics 514 coupled to or embedded in frame 505. As described above, display 512 may display images to the user electrically (e.g., using LCD) or optically (e.g., using a waveguide display and optical couplers) according to data received from a console, such as console 110. Display 512 may include sub-pixels to emit light of a predominant color, such as red, green, blue, white, or yellow. In some embodiments, display assembly 510 may include a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, display assembly 510 may include the stacked waveguide display and the varifocal waveguide display.

Display optics 514 may be similar to display optics 124 and may display image content optically (e.g., using optical waveguides and optical couplers), correct optical errors associated with the image light, combine images of virtual objects and real objects, and present the corrected image light to exit pupil 530 of near-eye display 500, where the user's eye 520 may be located at. Display optics 514 may also relay the image to create virtual images that appear to be away from the image source and further than just a few centimeters away from the eyes of the user. For example, display optics 514 may collimate the image source to create a virtual image that may appear to be far away and convert spatial information of the displayed virtual objects into angular information. Display optics 514 may also magnify the image source to make the image appear larger than the actual size of the image source. More detail of the display optics is described below.

The user experience with an artificial reality system may depend on several optical characteristics of the artificial reality system, such as the field of view (FOV), image quality (e.g., resolution), size of the eye box of the system (to accommodate for eye and/or head movement), the distance of eye relief, and brightness of the displayed image. In general, the FOV and the eye box should be as large as possible, and the brightness of the displayed image should be high enough (especially for optical see-through AR systems).

In a waveguide-based near-eye display, the output area of the display is usually much larger than the size of the eyebox of the near-eye display system. Thus, the portion of light that may reach user's eyes may depend on the ratio between the size of the eyebox and the output area of the display, which may be less than 10% for a certain eye relief and field of view. In order to achieve a desired brightness of the displayed image, the display light from the projector or the light source may need to be increased significantly, which may increase the power consumption and cause some safety concerns.

Figure 6B:
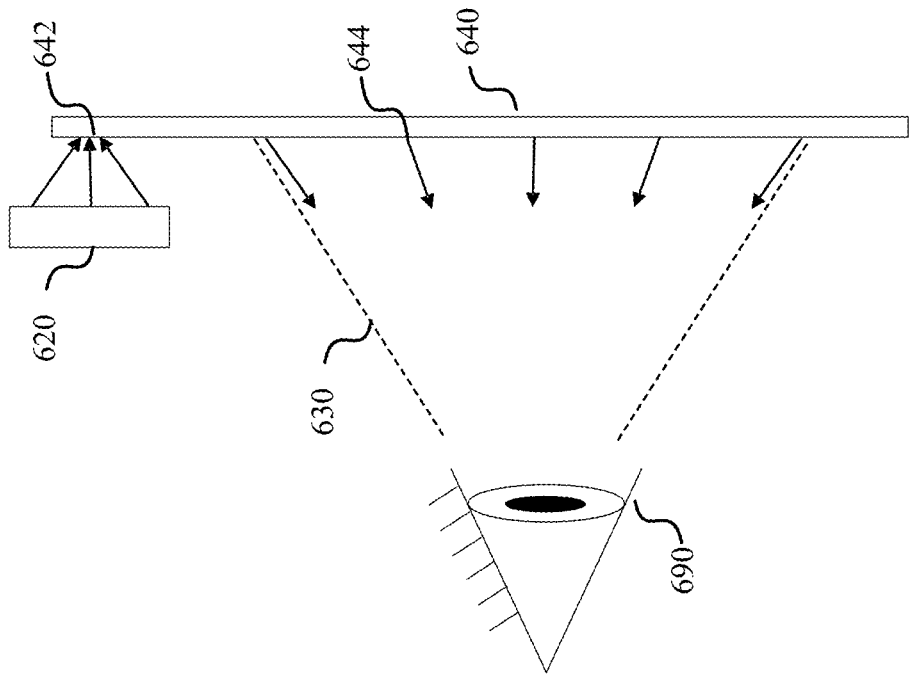
FIG. 6B illustrates an example of a waveguide-based near-eye display where display light is coupled out of the waveguide at different angles in different regions of the waveguide according to certain embodiments.
Figure 6A:
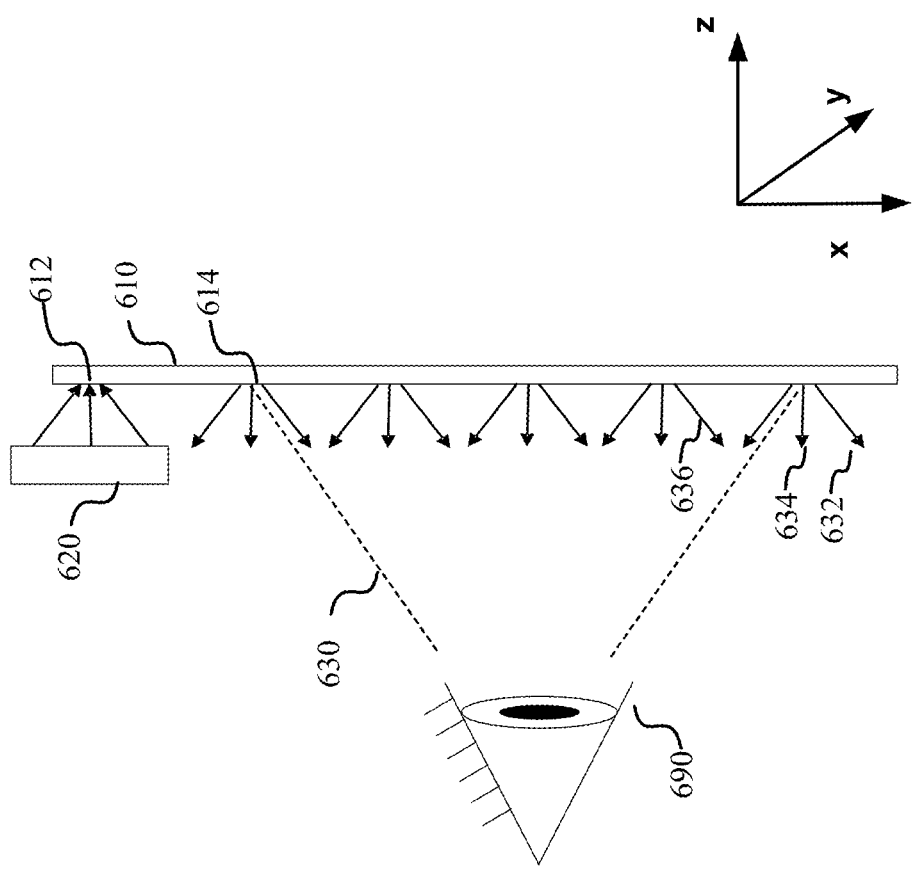
FIG. 6A illustrates an example of a waveguide-based near-eye display where display light for all fields of view is uniformly output from different regions of the waveguide.

FIG. 6A illustrates an example of a waveguide-based near-eye display where display light for all fields of view is uniformly output from different regions of a waveguide display 610. The near-eye display may include a projector 620 and waveguide display 610. Projector 620 may be similar to projector 410 and may include a light source or image source similar to light source or image source 412 and projector optics similar to projector optics 414. Waveguide display 610 may include a waveguide (e.g., a substrate), one or more input couplers 612, and one or more output couplers 614. Input couplers 612 may be configured to couple display light from different fields of view (or viewing angles) into the waveguide, and output couplers 614 may be configured to couple display light out of the waveguide. The input and output couplers may include, for example, slanted surface-relief gratings or volume Bragg gratings. In the example shown in FIG. 6, output coupler 614 may have similar grating parameters across the full region of the output coupler other than parameters that may be varied to adjust the coupling efficiency for more uniform output light. Thus, display light may be partially coupled out of the waveguide at different regions of waveguide display 610 in a similar manner as shown in FIG. 6A, where display light from all fields of view of the near-eye display may be partially coupled out of the waveguide at any given region of waveguide display 610.

As also shown in FIG. 6A, the near-eye display system may have an eyebox 690 having a limited size and thus a limited field of view 630. As such, not all light coupled out of the waveguide in waveguide display 610 may reach eyebox 690. For example, display light 632, 634, and 636 from waveguide display 610 may not reach eyebox 690, and thus may not be received by the user's eyes, which may result in significant loss of the optical power from projector 620.

According to certain embodiments, an optical coupler (e.g., a slanted surface-relief grating) for a waveguide-based display may include a grating coupler that includes multiple regions, where different regions of the grating coupler may have different angular selectivity characteristics (e.g., constructive interference conditions) for the incident display light such that, at any region of the waveguide-based display, diffraction light that would not eventually reach user's eyes may be suppressed (i.e., may not be diffracted by the grating coupler so as to be coupled into or out of the waveguide and thus may continue to propagate within the waveguide), while light that may eventually reach the user's eyes may be diffracted by the grating coupler and be coupled into or out of the waveguide. A width for each region of the multiple regions may be in the range of, for example, about 10 micrometers to about 1 millimeter.

FIG. 6B illustrates an example of a waveguide-based near-eye display where display light may be coupled out of a waveguide display 640 at different angles in different regions of the waveguide according to certain embodiments. Waveguide display 640 may include a waveguide (e.g., a substrate), one or more input couplers 642, and one or more output couplers 644. Input couplers 642 may be configured to couple display light from different fields of view (e.g., viewing angles) into the waveguide, and output couplers 644 may be configured to couple display light out of the waveguide. The input and output couplers may include, for example, slanted surface-relief gratings or other gratings. The output couplers may have different grating parameters and thus different angular selectivity characteristics at different regions of the output couplers. Thus, at each region of the output coupler, only display light that would propagate in a certain angular range towards an eyebox 690 of the near-eye display may be coupled out of the waveguide, while other display light may not meet the angular selectivity condition at the region and thus may not be coupled out of the substrate. In some embodiments, the input couplers may also have different grating parameters and thus different angular selectivity characteristics at different regions of the input couplers, and thus, at each region of an input coupler, only display light from a respective field of view may be coupled into the waveguide. As a result, most of the display light coupled into the waveguide and propagating in the waveguide can be efficiently sent to eyebox 690, thus improving the power efficiency of the waveguide-based near-eye display system.

Figures 7A, 7B, 7C:
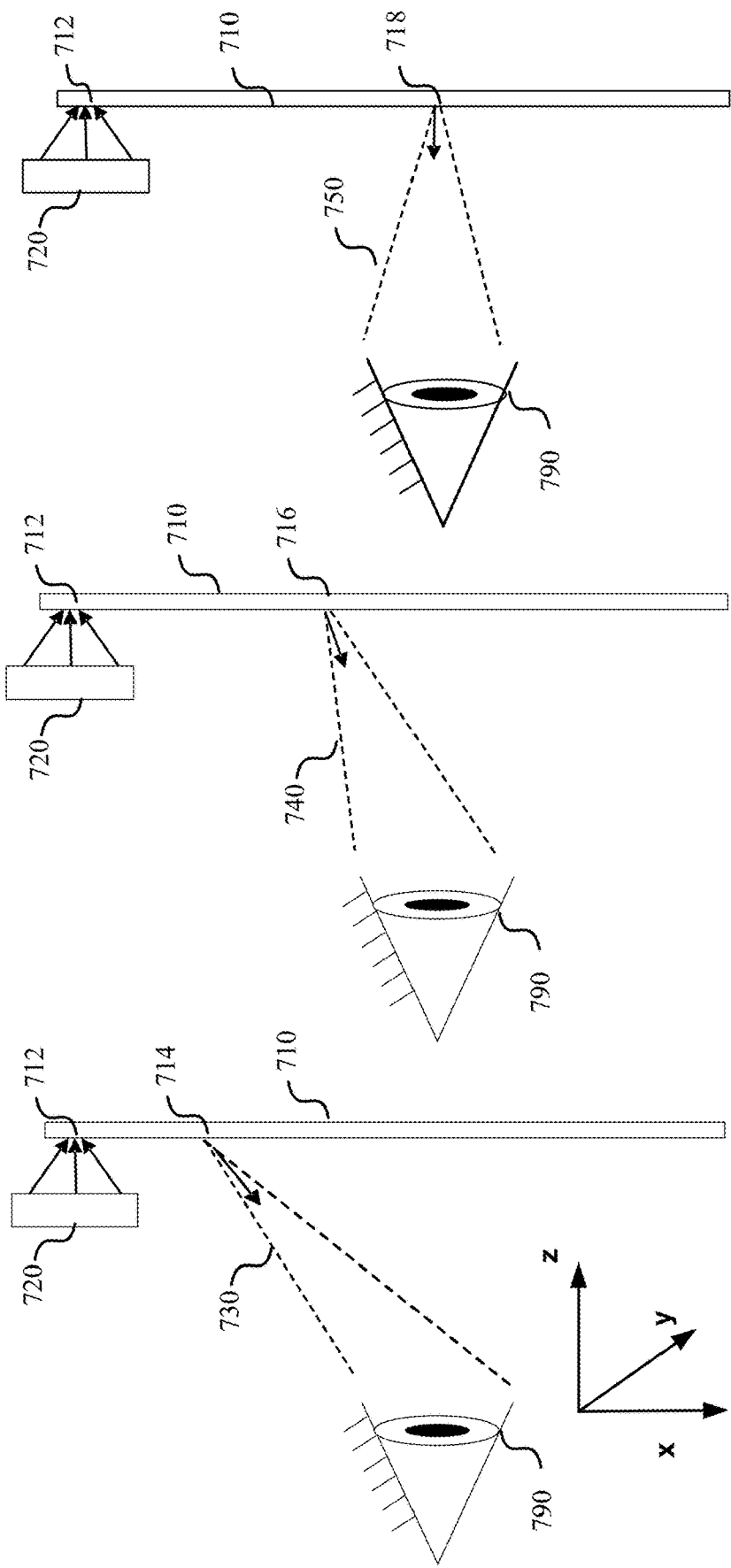
FIG. 7A illustrates an example of a waveguide-based near-eye display where display light is coupled out of the waveguide at a first angular range from a first region of the waveguide according to certain embodiments.
FIG. 7B illustrates an example of a waveguide-based near-eye display where display light is coupled out of the waveguide at a second angular range from a second region of the waveguide according to certain embodiments.
FIG. 7C illustrates an example of a waveguide-based near-eye display where display light is coupled out of the waveguide at a third angular range from a third region of the waveguide according to certain embodiments.

FIG. 7A illustrates an example of a waveguide-based near-eye display where display light is coupled out of the waveguide display 710 at a first angular range from a first region of the waveguide display according to certain embodiments. The waveguide-based near-eye display shown in FIG. 7A may be similar to the waveguide-based near-eye display shown in FIG. 6B. The near-eye display may include a projector 720 and waveguide display 710. Projector 720 may be similar to projector 410 or 620 and may include a light source or image source similar to light source or image source 412 and projector optics similar to projector optics 414 described above. Waveguide display 710 may include an input coupler 712 configured to couple display light from projector 720 into the waveguide display 710. The display light coupled into waveguide display 710 may propagate within the waveguide (e.g., a substrate as described above with respect to FIG. 4) due to total internal reflection. When the display light reaches a first output coupler (or a first region of an output coupler) 714, a portion of the display light that meets the constructive interference condition of first output coupler 714 may be coupled out of the waveguide. For example, first output coupler 714 may include a slanted surface-relief grating with a large refractive index modulation within each grating period, and the slant angle, the duty cycle, the refractive index modulation, and/or the grating period may be configured to selectively diffract incident light within a certain incident angular range at certain diffraction directions (e.g., within an angular range shown by an angular range 730). Because of the large refractive index modulation (e.g., >0.2), a large angular bandwidth (e.g., >10°) may be achieved at first output coupler 714 to provide a sufficiently large eyebox 790 for the waveguide-based near-eye display system.

FIG. 7B illustrates an example of a waveguide-based near-eye display as shown in FIG. 7A, where display light is coupled out of waveguide display 710 at a second angular range from a second region of the waveguide display according to certain embodiments. As shown in the example, when display light propagating within the substrate of waveguide display 710 reaches a second output coupler (or a second region of the output coupler) 716, a portion of the display light that meets the constructive interference condition of second output coupler 716 may be coupled out of the waveguide. For example, second output coupler 716 may include a slanted surface-relief grating with a large refractive index modulation within each grating period, and the slant angle, the duty cycle, the refractive index modulation, and/or the grating period may be different from those of first output coupler 714 and may be configured to selectively diffract incident light within a certain incident angular range at certain diffraction directions (e.g., within an angular range shown by an angular range 740). Because of the large refractive index modulation (e.g., >0.2), a large angular bandwidth (e.g., >10°) may be achieved at second output coupler 716 to sufficiently cover eyebox 790 of the waveguide-based near-eye display system.

FIG. 7C illustrates an example of a waveguide-based near-eye display as shown in FIG. 7A, where display light is coupled out of waveguide display 710 at a third angular range from a third region of the waveguide display according to certain embodiments. When display light propagating within the substrate of waveguide display 710 reaches a third output coupler (or a third region of the output coupler) 718, a portion of the display light that meets the constructive interference condition of third output coupler 718 may be coupled out of the waveguide. For example, output coupler 718 may include a slanted surface-relief grating with a large refractive index modulation within each grating period, and the slant angle, the duty cycle, the refractive index modulation, and/or the grating period may be different from those of first output coupler 714 and second output coupler 716 and may be configured to selectively diffract incident light within a certain incident angular range at certain diffraction directions (e.g., within an angular range shown by an angular range 750). Because of the large refractive index modulation (e.g., >0.2), a large angular bandwidth (e.g., >10°) may be achieved at output coupler 718 to sufficiently cover eyebox 790 of the waveguide-based near-eye display system.

There may be many different ways to manufacture grating couplers with varying configurations (e.g., duty cycles or refractive index modulations) over the full region of the grating coupler. For example, a slanted surface-relief grating coupler with a varying duty cycle may be fabricated using various lithography and etching techniques, such as ion beam etch (IBE), reactive ion beam etch (RIBE), or chemically assisted ion beam etch (CAME) process, or may be fabricated using pattern transfer techniques, such as nanoimprint lithography using a nanoimprint mold made by various etching, depositing, or 3-D printing processes. The different refractive index modulations can be achieved by, for example, varying the refractive index of the substrate on which the grating coupler is fabricated, varying the refractive index of imprint materials for nanoimprint, varying the overcoat material for the slanted surface-relief grating, or changing the doping in the overcoat layer at different regions of the grating coupler.

Figure 8:
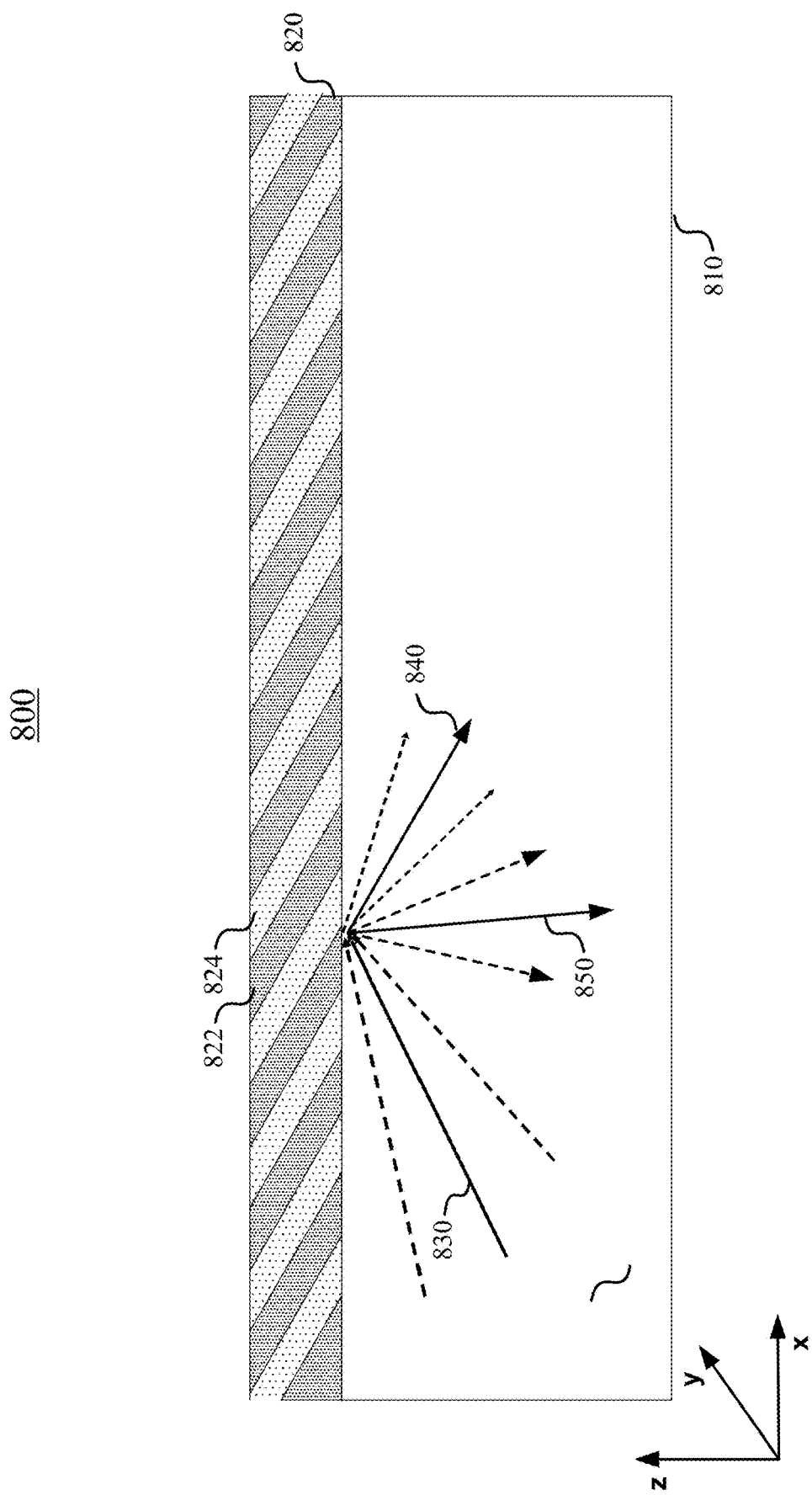
FIG. 8 illustrates light diffraction by an example of a slanted grating coupler on a front surface of a waveguide-based near-eye display according to certain embodiments.

FIG. 8 illustrates light diffraction by an example of a slanted grating coupler 820 on a front (or top) surface of a waveguide-based near-eye display 800 according to certain embodiments. Waveguide-based near-eye display 800 may include a waveguide 810 (e.g., a substrate) and slanted grating coupler 820. Waveguide 810 may be a flat or curved transparent substrate with a refractive index greater than the free space refractive index (i.e., 1.0) as described above with respect to, for example, FIG. 4. Slanted grating coupler 820 may be, for example, a slanted surface-relief grating where the gaps 824 (or the grooves) between grating ridges 822 may be filled with an overcoat material having a refractive index higher or lower than the refractive index of grating ridges 822. For example, in some embodiments, a high refractive index material, such as Hafnia, Tantalum oxide, Tungsten oxide, Zirconium oxide, Gallium sulfide, Gallium nitride, Gallium phosphide, silicon, and a high refractive index polymer, may be used to fill gaps 824. In some embodiments, a low refractive index material, such as silicon oxide, alumina, porous silica, or fluorinated low index monomer (or polymer), may be used to fill gaps 824. As a result, the difference between the refractive index of the ridges and the refractive index of the grooves may be greater than 0.1, 0.2, 0.3, 0.5, 1.0, or higher.

Display light 830 may be coupled into waveguide 810 by, for example, input coupler 642 or 712, or other couplers (e.g., a prism or slanted surface) described above. Display light 830 may propagate within waveguide 810 through, for example, total internal reflection. When display light 830 reaches slanted grating coupler 820, the display light may be diffracted by slanted grating coupler 820 into, for example, a $0^{th}$ order diffraction (i.e., reflection) light 840 and a −1st order diffraction light 850. The $0^{th}$ order diffraction may continue to propagate within waveguide 810, and may be reflected by the bottom surface of waveguide 810 towards slanted grating coupler 820 at a different location. The −1st order diffraction light 850 may be coupled (e.g., refracted) out of waveguide 810 towards the user's eye, because a total internal reflection condition may not be met at the bottom surface of waveguide 810 due to the diffraction angle.

Because of the relatively large refractive index modulation, display light incident on slanted grating coupler 820 at angles with an angular range may meet or substantially meet the constructive interference condition for the $-1^{st}$ or higher order diffraction, and thus may be diffracted out of waveguide 810 with a high diffraction efficiency. Therefore, the −1st or higher order diffraction may include light propagating in directions with an angular range, which may correspond to a portion of the total field of view of the near-eye display system.

Figure 9:
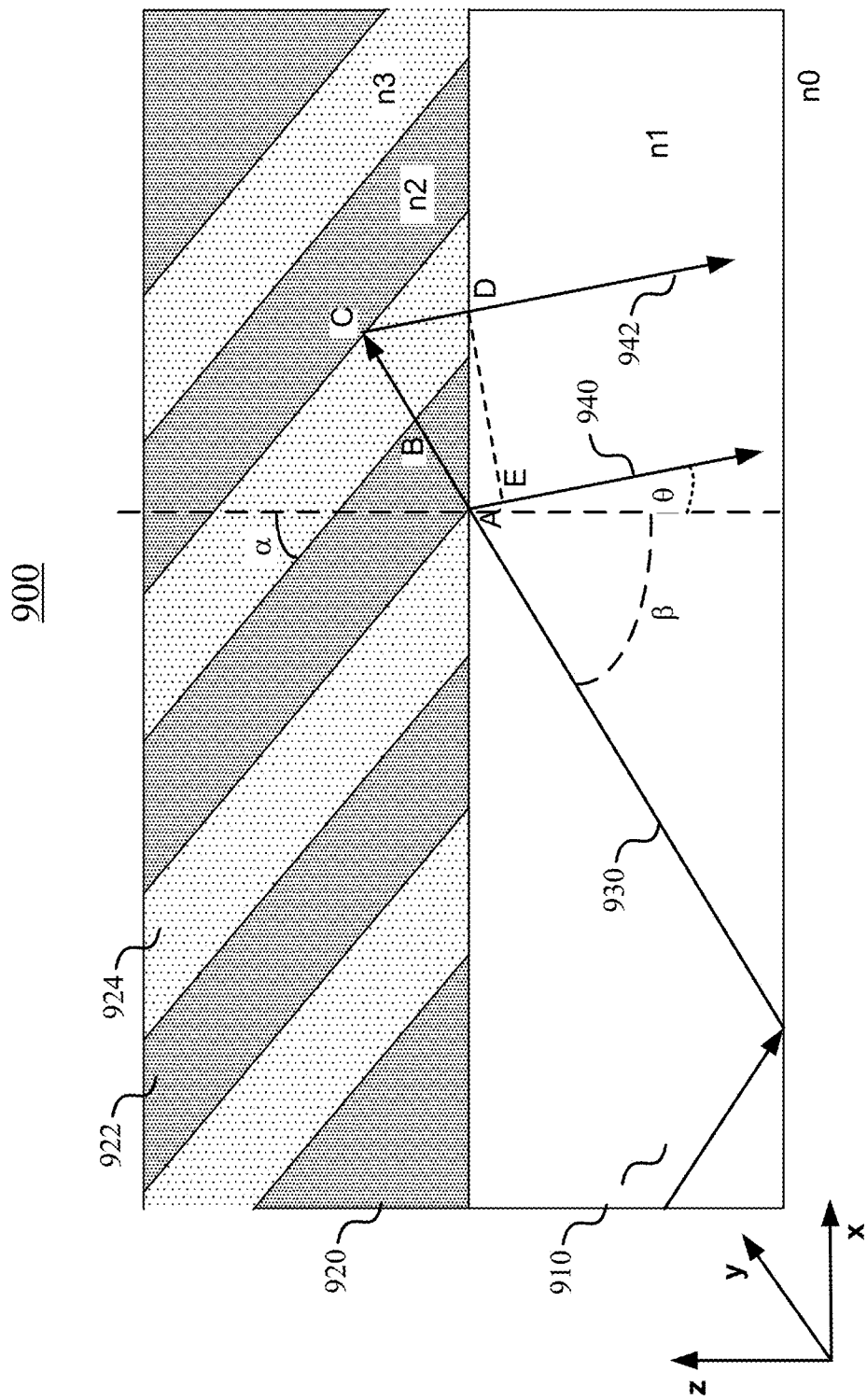
FIG. 9 illustrates the angular selectivity of an example of a slanted grating coupler in a waveguide-based near-eye display according to certain embodiments.

FIG. 9 illustrates the angular selectivity of an example of a slanted grating coupler 920 in a waveguide-based near-eye display 900 according to certain embodiments. As waveguide-based near-eye display 800 described above within FIG. 8, waveguide-based near-eye display 900 may include a waveguide 910 (e.g., a substrate) and slanted grating coupler 920 formed on the substrate. Waveguide 910 may be a flat or curved transparent substrate with a refractive index greater than the free space refractive index. Slanted grating coupler 920 may be, for example, a slanted surface-relief grating where the gaps 924 (or the grooves) between grating ridges 922 may be filled with an overcoat material as described above with respect to FIG. 8. The slanted surface-relief grating may have a slant angle α with respect to the surface normal of the substrate of waveguide 910.

Display light 930 propagating within waveguide 910 through total internal reflection may be incident on slanted grating coupler 920 with an incident angle β. A portion of the incident display light 930 may be diffracted by grating coupler 920 as shown by light rays 940 and 942. The optical path length difference between light rays 940 and 942 may be an integer multiple of the wavelength of the display light, such that light rays 940 and 942 may be constructively interfere with each other to meet the diffraction conditions. Light rays 940 and 942 may be deflected by adjacent grating ridges. The optical path length difference between light rays 940 and 942 in the example shown in FIG. 9 may be approximately determined by:

$$AB \times n_2 + (BC+CD) \times n_3 - AE \times n_1 = m \times \lambda,$$

where m is an integer, λ is the wavelength of the display light, AB, BC, CD, and AE are the physical lengths between corresponding points in the FIG. 9, n1 is the refractive index of the substrate, n2 is the refractive index of grating ridges 922, and n3 is the refractive index of the overcoat material. The lengths of AB, BC, CD, and AE may depend on incident angle β, diffraction angle θ, slant angle α of the grating, the duty cycle of the grating, the grating period, and the refractive indices of the grating and overcoat materials. Thus, in order to selectively diffract light incident at angle β out of the substrate at a diffraction angle θ, the parameters of the grating coupler may be selected accordingly to meet the above described condition.

Figure 10:
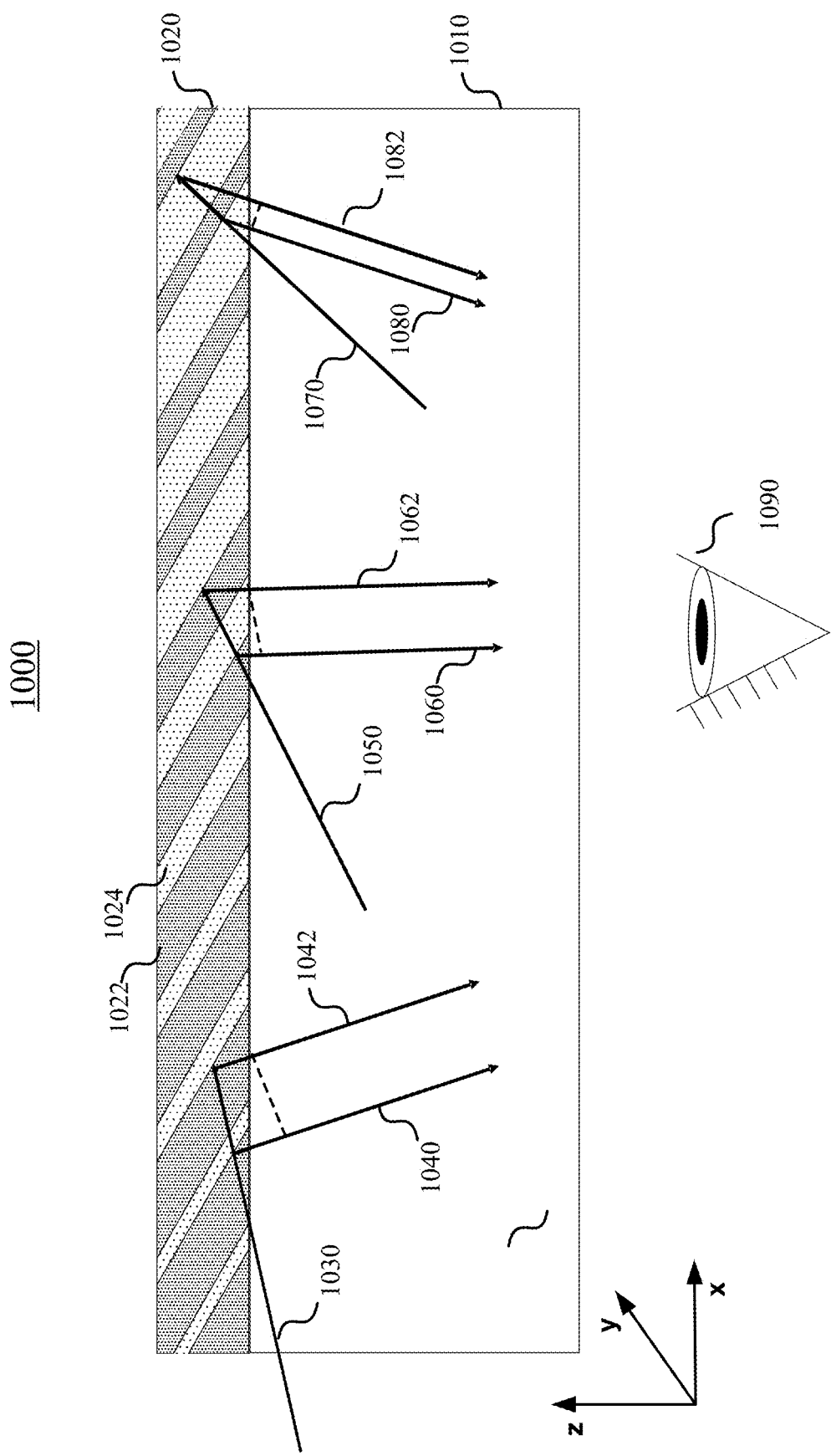
FIG. 10 illustrates angular selectivity characteristics of different regions of an example of a slanted grating coupler in a waveguide-based near-eye display, where the slanted grating coupler has different duty cycles at different regions according to certain embodiments.

FIG. 10 illustrates angular selectivity characteristics of different regions of an example of a slanted grating coupler 1020 in a waveguide-based near-eye display 1000, where slanted grating coupler 1020 has different duty cycles (and thus different angular selectivity characteristics) at different regions according to certain embodiments. Waveguide-based near-eye display 1000 may include a waveguide 1010 (e.g., a substrate) and slanted grating coupler 1020 formed on the substrate. Slanted grating coupler 1020 may include a slanted surface-relief grating where the gaps 1024 (or the grooves) between grating ridges 1022 may be filled with an overcoat material that has a refractive index higher or lower than the refractive index of the grating ridges as described above with respect to FIG. 8. Slanted grating coupler 1020 may have a substantially uniform grating period and a substantially uniform slant angle across the full area of slanted grating coupler 1020. However, the duty cycle may vary gradually as shown in FIG. 10. For example, the duty cycle of the slanted surface-relief grating may be relatively large (e.g., about 0.95) at one end, and may be relatively small (e.g., about 0.05) at the other end. In some embodiments, the depth or the thickness of the slanted surface-relief grating may be greater than, for example, about 10 nm, about 20 nm, about 50 nm, about 100 nm, or higher. In some embodiments, the depth or the thickness of the slanted surface-relief grating may be greater than a half of the grating period of slanted grating coupler 1020.

In the example shown in FIG. 10, the overcoat material in gaps 1024 may have a refractive index lower than that of grating ridges 1022, and the duty cycle of the slanted surface-relief grating may gradually decease from left to right in the x direction. Near the left end of the slanted surface-relief grating, the incident angle of display light 1030 on slanted grating coupler 1020 may be relatively large, and thus the slanted surface-relief grating may have a larger portion with a higher refractive index (i.e., a larger duty cycle) in order to meet the constructive interference condition between diffraction light 1040 and 1042 that may propagate towards an eyebox 1090 of the near-eye display system as described above with respect to FIG. 9. In the middle of the slanted surface-relief grating, the incident angle of display light 1050 on slanted grating coupler 1020 may be relatively small compared with display light 1030, and thus the slanted surface-relief grating may have a smaller portion with a higher refractive index (i.e., a smaller duty cycle) in order to meet the constructive interference condition between diffraction light 1060 and 1062 that may propagate towards eyebox 1090 of the near-eye display system. Near the right end of the slanted surface-relief grating, the incident angle of display light 1070 on slanted grating coupler 1020 may be even smaller, and thus the slanted surface-relief grating may have a much smaller portion with a higher refractive index (i.e., a smallest duty cycle) in order to meet the constructive interference condition between diffraction light 1080 and 1082 that may propagate towards eyebox 1090 of the near-eye display system.

In some embodiments, the overcoat material in gaps 1024 may have a refractive index greater than that of grating ridges 1022, and thus the duty cycle of the slanted surface-relief grating may gradually increase from left to right.

Figure 11:
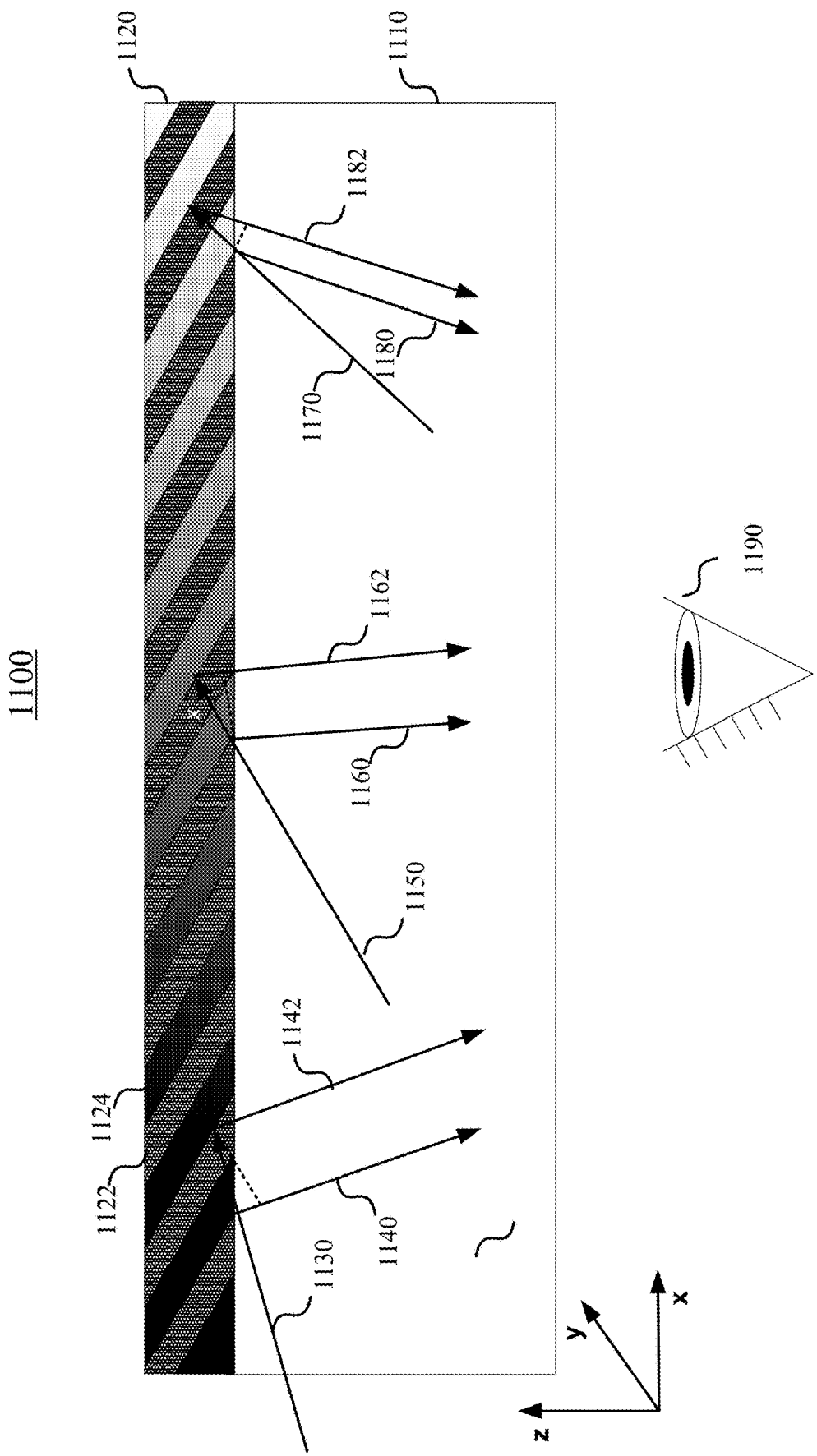
FIG. 11 illustrates the angular selectivity characteristics of different regions of an example of a slanted grating coupler in a waveguide-based near-eye display, where the slanted grating coupler has different refractive index modulations at different regions according to certain embodiments.

FIG. 11 illustrates angular selectivity characteristics at different regions of an example of a slanted grating coupler 1120 in a waveguide-based near-eye display 1100, where the slanted grating coupler has different refractive index modulations at different regions according to certain embodiments. Waveguide-based near-eye display 1100 may include a waveguide 1110 (e.g., a substrate) and slanted grating coupler 1120 formed on the substrate. Slanted grating coupler 1120 may include a slanted surface-relief grating where the gaps 1124 (or the grooves) between grating ridges 1122 may be filled with overcoat materials that may have refractive indices higher or lower than the refractive index of the grating ridges as described above with respect to FIG. 8. Slanted grating coupler 1120 may have a substantially uniform grating period, a substantially uniform duty cycle, and a substantially uniform slant angle across the full area of slanted grating coupler 1120. However, the refractive index of the overcoat materials may vary gradually as shown in FIG. 11. For example, the overcoat materials that fill gaps 1124 between grating ridges 1122 may be changed gradually or may be doped differently at different regions of slanted grating coupler 1120.

In the example shown in FIG. 11, the refractive index of the overcoat material in gaps 1124 may gradually decease from left to right in the x direction. Near the left end of the slanted surface-relief grating, the incident angle of display light 1130 on slanted grating coupler 1120 may be relatively large, and thus the refractive index of the overcoat material may be relative large in order to meet the constructive interference condition between diffraction light 1140 and 1142 that may propagate towards an eyebox 1190 of the near-eye display system as described above with respect to FIG. 9. In the middle of the slanted surface-relief grating, the incident angle of display light 1150 on slanted grating coupler 1120 may be relatively small compared with display light 1130, and thus the refractive index of the overcoat material may be smaller in order to meet the constructive interference condition between diffraction light 1160 and 1162 that may propagate towards eyebox 1190 of the near-eye display system. Near the right end of the slanted surface-relief grating, the incident angle of display light 1170 on slanted grating coupler 1120 may be even smaller, and thus the refractive index of the overcoat material may be even smaller in order to meet the constructive interference condition between diffraction light 1180 and 1182 that may propagate towards eyebox 1190 of the near-eye display system.

Thus, by varying the duty cycle of the slanted surface-relief grating (e.g., from about 0.05 to about 0.95) and/or the refractive index of the overcoat material (or the grating ridges), the angular selectivity of the slanted grating coupler may be adjusted to only selectively diffract display light that may propagate in a direction towards the eyebox of the near-eye display system. As a result, there may be less stray light outside of the eyebox from the waveguide display, and hence the power efficiency of the waveguide-based near-eye display may be improved.

In some embodiments, the slanted grating coupler may be formed on the back (or bottom) surface, rather than the front (or top) surface, of the waveguide-based near-eye display. The duty cycle of the slanted surface-relief grating and/or the refractive index of the overcoat material (or the grating ridges) may be similarly varied across the area of the slanted grating coupler to achieve the desired angular selectivity of the diffracted light.

Figure 12:
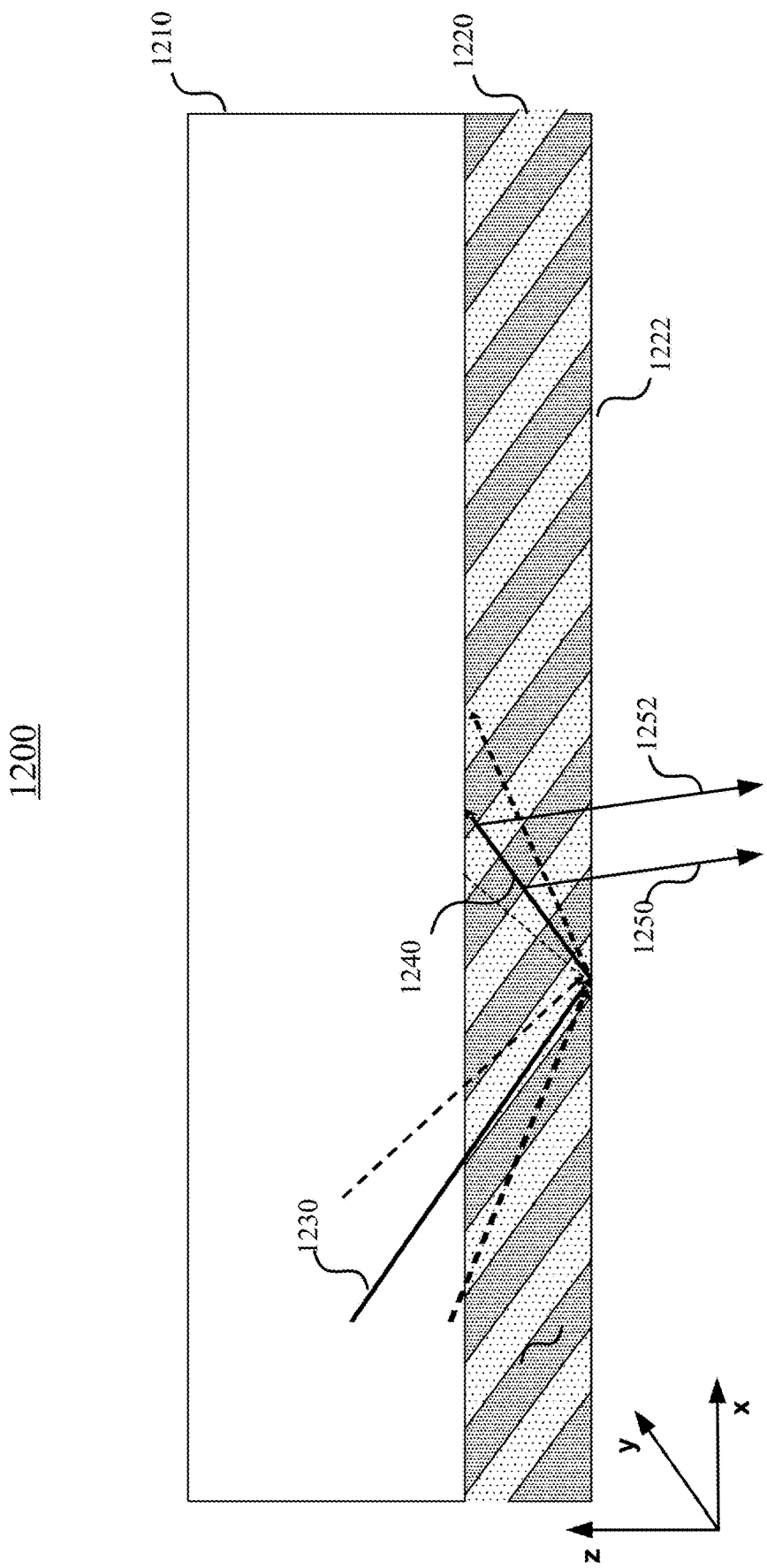
FIG. 12 illustrates light diffraction by an example of a slanted grating coupler on a back surface of a waveguide-based near-eye display according to certain embodiments.

FIG. 12 illustrates light diffraction by an example of a slanted grating coupler 1220 on a back (or bottom) surface of a waveguide-based near-eye display 1200 according to certain embodiments. Slanted grating coupler 1220 may be similar to slanted grating coupler 1020 or 1120 described above, and may be formed on the bottom surface of a waveguide 1210 (e.g., a flat or curved substrate). Display light 1230 propagate within waveguide 1210 may be reflected at a bottom surface 1222 of slanted grating coupler 1220. Display light 1240 reflected at bottom surface 1222 of slanted grating coupler 1220 may reach slanted grating coupler 1220 again, and may be reflectively diffracted by slanted grating coupler 1220. To be efficiently diffracted, display light 1250 and 1252 may meet the constructive interference condition similar to the constructive interference condition described above with respect to FIG. 9. The constructive interference condition may be met by selecting the appropriate grating parameters as described above, such as the duty cycle of the slanted surface relief grating and/or the refractive index of the grating ridges or overcoat material. At different locations of the slanted grating coupler, the incident angle and the diffraction angle of the display light may be different, and thus the grating parameters may be different in order to meet the constructive interference condition for the incident angle and the desired diffraction angle.

As described above, in some embodiments, the input coupler of the waveguide-based display may have different angular selectivity characteristics as well in order to more efficiently couple display light from different portions of the field of view into the waveguide, while reducing undesired coupling of display light out of the waveguide in the input region.

Figure 13:
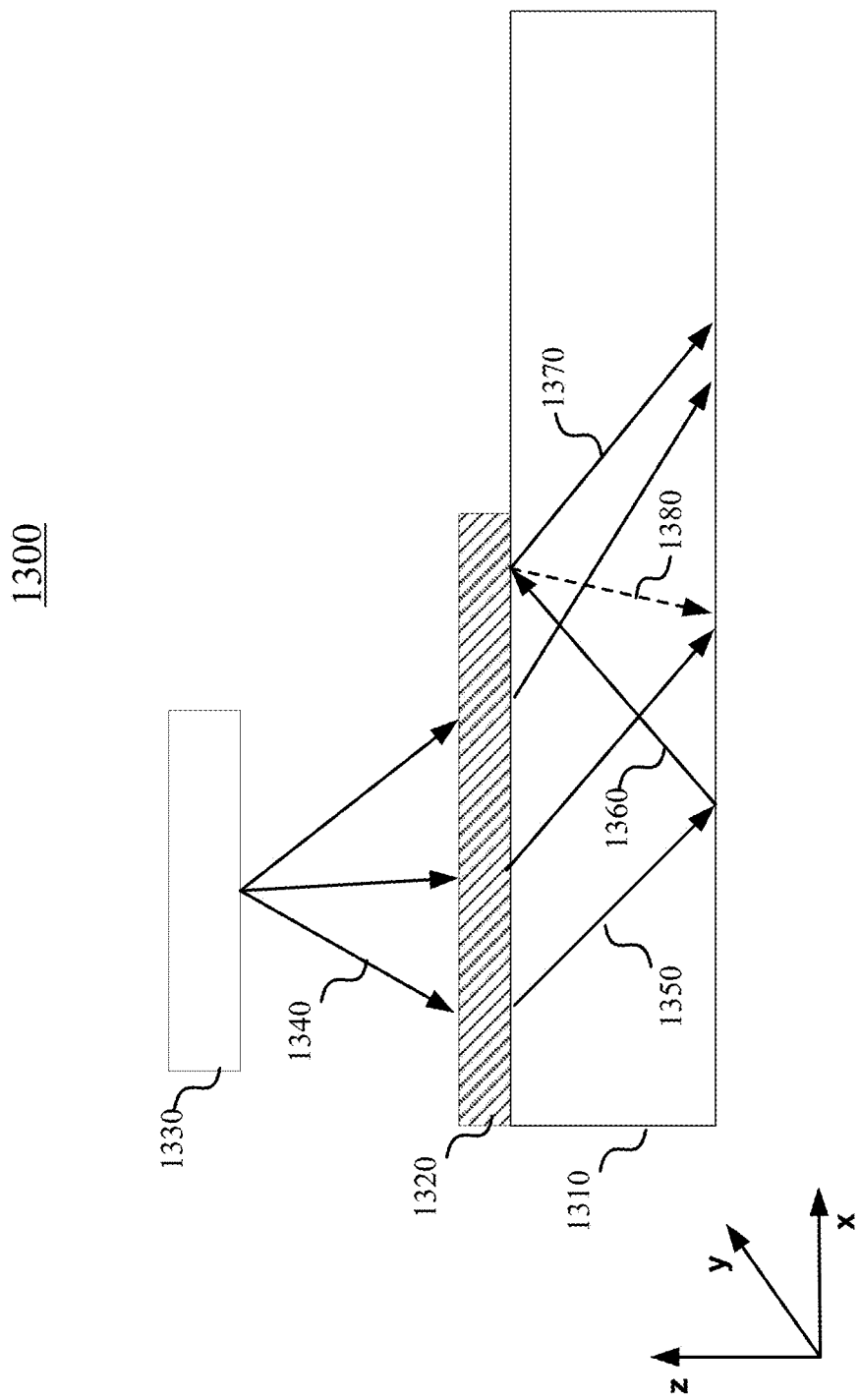
FIG. 13 illustrates an example of a waveguide-based near-eye display where display light from different fields of view may be coupled into the waveguide at different angles in different regions of an input coupler according to certain embodiments.

FIG. 13 illustrates an example of a waveguide-based near-eye display 1300 where display light from different fields of view (or viewing angles) may be coupled into a waveguide 1310 at different angles in different regions of an input coupler 1320 according to certain embodiments. Waveguide-based near-eye display 1300 may include a projector 1330 similar to projector 410, 620, or 720, and may collimate or focus display light from an image source as described with respect to FIG. 4. Display light from projector 1330 may include light from different fields of view (e.g., different angles). If input coupler 1320 has a uniform configuration in the x direction, some display light coupled into waveguide 1310 by input coupler 1320 may be coupled out of waveguide 1310 by different areas of the input coupler. For example, as shown in FIG. 13, light beam 1340 from projector 1330 may be coupled into waveguide 1310 by a first region of input coupler 1320 and become guided display light 1350. Guided display light 1350 may propagate within waveguide 1310 through total internal reflection and may reach a second region of input coupler as shown by light beam 1360. If the first region and the second region of input coupler 1320 have the same grating parameters, a significant portion of light beam 1360 may be coupled out of waveguide 1310 as diffraction light 1380, which may result in, for example, power loss and pupil clipping.

According to certain embodiments, the second region and the first region of input coupler 1320 may have different grating parameters (e.g., duty cycles and/or refractive index modulations) and thus different angular selectivity characteristics. As such, light beam 1340 may be efficiently coupled into waveguide 1310 at the first region as guided display light 1350, while light beam 1360 incident on the second region may not meet the constructive interference condition of input coupler 1320 at the second region and thus may not be diffracted as diffraction light 1380. Thus, light beam 1360 may mostly be reflected as light beam 1370 to continue to propagate within waveguide 1310. In this way, light from different fields of view (e.g., different angles) may be more efficiently coupled into the waveguide and propagate within the waveguide until it meets the grating condition at an output coupler or a portion of the output coupler.

Figure 14:
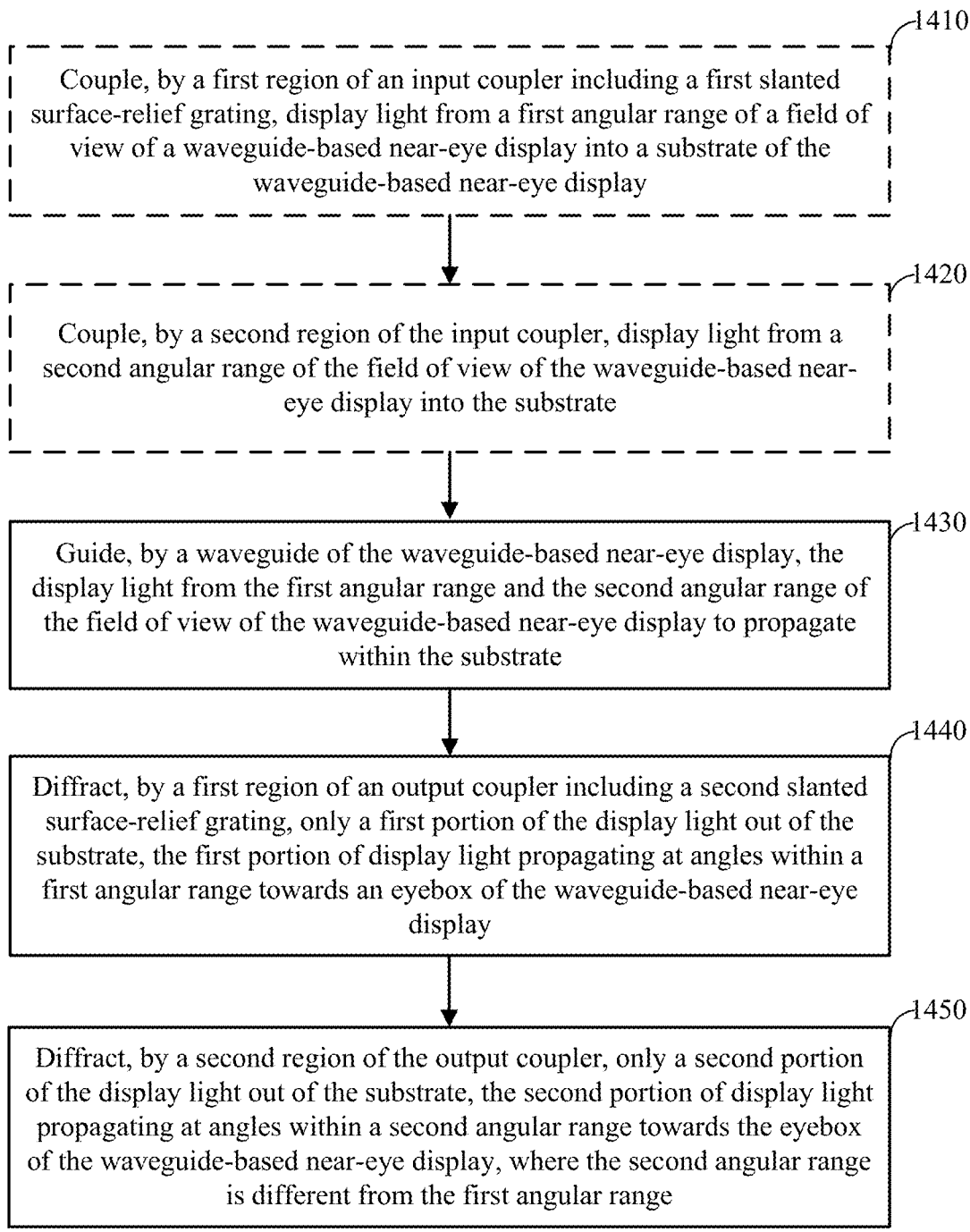
FIG. 14 illustrates an example of a method of displaying images using a waveguide-based near-eye display according to certain embodiments.

FIG. 14 is a simplified flow chart 1400 illustrating an example method of displaying images using a waveguide-based near-eye display according to certain embodiments. The operations described in flow chart 1400 are for illustration purposes only and are not intended to be limiting. In various implementations, modifications may be made to flow chart 1400 to add additional operations or to omit some operations. The operations described in flow chart 1400 may be performed using, for example, waveguide display 640, waveguide display 710, waveguide-based near-eye display 1000, waveguide-based near-eye display 1100, or waveguide-based near-eye display 1300.

Optionally, at block 1410, a first region of an input coupler of a waveguide-based near-eye display may only couple display light from a first angular range of the field of view of the waveguide-based near-eye display into a substrate of the waveguide-based near-eye display. The input coupler may be formed on any side of the substrate of the waveguide-based near-eye display. The input coupler may include a first slanted surface-relief grating as described above with respect to, for example, FIG. 13. The first slanted surface-relief grating may have a slant angle greater than 30°, 45°, 50°, or larger. The first slanted surface-relief grating may include an overcoat layer covering the slanted surface-relief grating and filling the gaps between the grating ridges. As described above with respect to, for example, FIG. 8, the overcoat layer may include one or more materials with refractive indices different from (e.g., >0.2 greater than or lower than) that of the grating ridges. The first angular range may be 10° or higher, such as from a view angle of 60° to a view angle of 70° or larger.

Optionally, at block 1420, a second region of the input coupler may only couple display light from a second angular range of the field of view of the waveguide-based near-eye display into the substrate. The second angular range of the waveguide-based near-eye display may be 10° or higher, such as from a view angle of 40° to a view angle of 50° or larger. The first region and the second region of the input coupler may have different grating parameters, such as duty cycle, refractive index modulation (different in refractive index between the grating ridges and the overcoat), etc.

At block 1430, a waveguide (e.g., the substrate) of the waveguide-based near-eye display may guide the display light from the first angular range and the second angular range of the field of view of the waveguide-based near-eye display to propagate within the substrate through total internal reflection. The display light from the first angular range and the display light from the second angular range of the field of view of the waveguide-based near-eye display may propagate within the substrate at different angles.

At block 1440, a first region of an output coupler at a surface of the waveguide (e.g., the substrate) may diffract only a first portion of the display light out of the substrate, where the first portion of display light may propagate at angles within a first angular range (e.g., a range of 10° or larger) towards an eyebox of the waveguide-based near-eye display. The output coupler may be formed on any side of the substrate of the waveguide-based near-eye display. The output coupler may include a second slanted surface-relief grating as described above with respect to, for example, FIGS. 6B, 7A-7C, 10, and 11. The second slanted surface-relief grating may have a slant angle greater than 30°, 45°, 50°, or larger. The second slanted surface-relief grating may include an overcoat layer covering the slanted surface-relief grating and filling the gaps between the grating ridges. As described above with respect to, for example, FIG. 8, the overcoat layer may include one or more materials with refractive indices different from (e.g., >0.2 greater than or lower than) that of the grating ridges. Because of the relative large refractive index modulation, incident light within a large angular range (e.g., 10° or larger) may meet or substantially meet the constructive interference condition at the first region of the output coupler and thus may be coupled out of the substrate by diffraction.

At block 1450, a second region of the output coupler may only diffract a second portion of the display light out of the substrate, where the second portion of display light may propagate at angles within a second angular range towards the eyebox of the waveguide-based near-eye display, and the second angular range may be different from the first angular range. As described above, the first region and the second region of the output coupler may have different grating parameters, such as duty cycle, refractive index modulation (different in refractive index between the grating ridges and the overcoat), etc., and thus different angular selectivity characteristics.

In this way, the display light from different fields of view may be efficiently coupled by different regions of an input coupler into the waveguide, and the display light propagating within the waveguide may be coupled out of the waveguide by different regions of an output coupler such that the display light coupled out by the output coupler may only propagate towards the eyebox of the waveguide-based near-eye display. Thus, the power efficiency of the near-eye display system can be significantly improved.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 15:
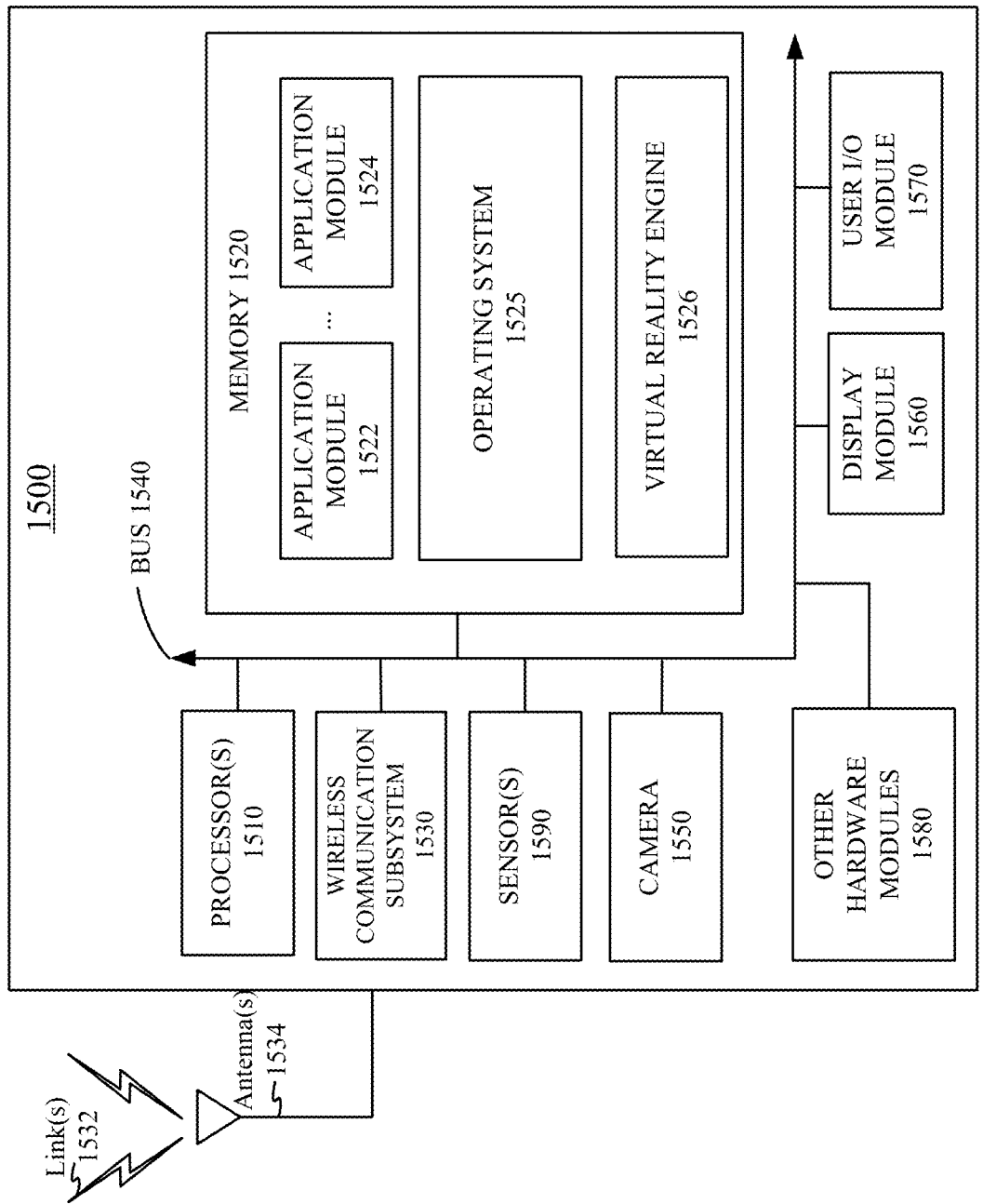
FIG. 15 is a simplified block diagram of an example electronic system of an example near-eye display according to certain embodiments.

FIG. 15 is a simplified block diagram of an example electronic system 1500 of an example near-eye display (e.g., HMD device) for implementing some of the examples disclosed herein. Electronic system 1500 may be used as the electronic system of an HMD device or other near-eye displays described above. In this example, electronic system 1500 may include one or more processor(s) 1510 and a memory 1520. Processor(s) 1510 may be configured to execute instructions for performing operations at a number of components, and can be, for example, a general-purpose processor or microprocessor suitable for implementation within a portable electronic device. Processor(s) 1510 may be communicatively coupled with a plurality of components within electronic system 1500. To realize this communicative coupling, processor(s) 1510 may communicate with the other illustrated components across a bus 1540. Bus 1540 may be any subsystem adapted to transfer data within electronic system 1500. Bus 1540 may include a plurality of computer buses and additional circuitry to transfer data.

Memory 1520 may be coupled to processor(s) 1510. In some embodiments, memory 1520 may offer both short-term and long-term storage and may be divided into several units. Memory 1520 may be volatile, such as static random access memory (SRAM) and/or dynamic random access memory (DRAM) and/or non-volatile, such as read-only memory (ROM), flash memory, and the like. Furthermore, memory 1520 may include removable storage devices, such as secure digital (SD) cards. Memory 1520 may provide storage of computer-readable instructions, data structures, program modules, and other data for electronic system 1500. In some embodiments, memory 1520 may be distributed into different hardware modules. A set of instructions and/or code might be stored on memory 1520. The instructions might take the form of executable code that may be executable by electronic system 1500, and/or might take the form of source and/or installable code, which, upon compilation and/or installation on electronic system 1500 (e.g., using any of a variety of generally available compilers, installation programs, compression/decompression utilities, etc.), may take the form of executable code.

In some embodiments, memory 1520 may store a plurality of application modules 1522 through 1524, which may include any number of applications. Examples of applications may include gaming applications, conferencing applications, video playback applications, or other suitable applications. The applications may include a depth sensing function or eye tracking function. Application modules 1522-1524 may include particular instructions to be executed by processor(s) 1510. In some embodiments, certain applications or parts of application modules 1522-1524 may be executable by other hardware modules 1580. In certain embodiments, memory 1520 may additionally include secure memory, which may include additional security controls to prevent copying or other unauthorized access to secure information.

In some embodiments, memory 1520 may include an operating system 1525 loaded therein. Operating system 1525 may be operable to initiate the execution of the instructions provided by application modules 1522-1524 and/or manage other hardware modules 1580 as well as interfaces with a wireless communication subsystem 1530 which may include one or more wireless transceivers. Operating system 1525 may be adapted to perform other operations across the components of electronic system 1500 including threading, resource management, data storage control and other similar functionality.

Wireless communication subsystem 1530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1500 may include one or more antennas 1534 for wireless communication as part of wireless communication subsystem 1530 or as a separate component coupled to any portion of the system. Depending on desired functionality, wireless communication subsystem 1530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1530 may permit data to be exchanged with a network, other computer systems, and/or any other devices described herein. Wireless communication subsystem 1530 may include a means for transmitting or receiving data, such as identifiers of HMD devices, position data, a geographic map, a heat map, photos, or videos, using antenna(s) 1534 and wireless link(s) 1532. Wireless communication subsystem 1530, processor(s) 1510, and memory 1520 may together comprise at least a part of one or more of a means for performing some functions disclosed herein.

Embodiments of electronic system 1500 may also include one or more sensors 1590. Sensor(s) 1590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1500 may include a display module 1560. Display module 1560 may be a near-eye display, and may graphically present information, such as images, videos, and various instructions, from electronic system 1500 to a user. Such information may be derived from one or more application modules 1522-1524, virtual reality engine 1526, one or more other hardware modules 1580, a combination thereof, or any other suitable means for resolving graphical content for the user (e.g., by operating system 1525). Display module 1560 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1500 may include a user input/output module 1570. User input/output module 1570 may allow a user to send action requests to electronic system 1500. An action request may be a request to perform a particular action. For example, an action request may be to start or end an application or to perform a particular action within the application. User input/output module 1570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1500. In some embodiments, user input/output module 1570 may provide haptic feedback to the user in accordance with instructions received from electronic system 1500. For example, the haptic feedback may be provided when an action request is received or has been performed.

Electronic system 1500 may include a camera 1550 that may be used to take photos or videos of a user, for example, for tracking the user's eye position. Camera 1550 may also be used to take photos or videos of the environment, for example, for VR, AR, or MR applications. Camera 1550 may include, for example, a complementary metal-oxidesemiconductor (CMOS) image sensor with a few millions or tens of millions of pixels. In some implementations, camera 1550 may include two or more cameras that may be used to capture 3-D images.

In some embodiments, electronic system 1500 may include a plurality of other hardware modules 1580. Each of other hardware modules 1580 may be a physical module within electronic system 1500. While each of other hardware modules 1580 may be permanently configured as a structure, some of other hardware modules 1580 may be temporarily configured to perform specific functions or temporarily activated. Examples of other hardware modules 1580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1580 may be implemented in software.

In some embodiments, memory 1520 of electronic system 1500 may also store a virtual reality engine 1526. Virtual reality engine 1526 may execute applications within electronic system 1500 and receive position information, acceleration information, velocity information, predicted future positions, or some combination thereof of the HMD device from the various sensors. In some embodiments, the information received by virtual reality engine 1526 may be used for producing a signal (e.g., display instructions) to display module 1560. For example, if the received information indicates that the user has looked to the left, virtual reality engine 1526 may generate content for the HMD device that mirrors the user's movement in a virtual environment. Additionally, virtual reality engine 1526 may perform an action within an application in response to an action request received from user input/output module 1570 and provide feedback to the user. The provided feedback may be visual, audible, or haptic feedback. In some implementations, processor(s) 1510 may include one or more GPUs that may execute virtual reality engine 1526.

In various implementations, the above-described hardware and modules may be implemented on a single device or on multiple devices that can communicate with one another using wired or wireless connections. For example, in some implementations, some components or modules, such as GPUs, virtual reality engine 1526, and applications (e.g., tracking application), may be implemented on a console separate from the head-mounted display device. In some implementations, one console may be connected to or support more than one HMD.

In alternative configurations, different and/or additional components may be included in electronic system 1500. Similarly, functionality of one or more of the components can be distributed among the components in a manner different from the manner described above. For example, in some embodiments, electronic system 1500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical coupler for a waveguide-based display, the optical coupler comprising:
   a slanted surface-relief grating including a plurality of regions,
   wherein different regions of the plurality of regions of the slanted surface-relief grating have at least one of different respective grating duty cycles or different respective refractive index modulations such that the different regions have different angular selectivity characteristics for incident display light; and
   wherein display light for different viewing angles is diffracted by the different regions of the plurality of regions of the slanted surface-relief grating.

2. The optical coupler of claim 1, wherein the different regions of the plurality of regions of the slanted surface-relief grating have different slant angles.

3. The optical coupler of claim 1, wherein:
   the slanted surface-relief grating comprises an overcoat layer filling gaps in the slanted surface-relief grating; and
   the different regions of the plurality of regions of the slanted surface-relief grating have different refractive indexes in the overcoat layer.

4. The optical coupler of claim 3, wherein the overcoat layer includes different materials or a same material with the different doping at the different regions of the plurality of regions of the slanted surface-relief grating.

5. The optical coupler of claim 1, wherein:
   the slanted surface-relief grating comprises an overcoat layer filling gaps in the slanted surface-relief grating; and
   a difference between a refractive index of the overcoat layer and a refractive index of the slanted surface-relief grating is equal to or greater than 0.2.

6. The optical coupler of claim 1, wherein:
   the slanted surface-relief grating is configured to couple display light out of a waveguide of the waveguide-based display; and
   the display light diffracted by the different regions of the plurality of regions of the slanted surface-relief grating out of the waveguide propagates at different directions towards an eyebox of the waveguide-based display.

7. The optical coupler of claim 6, wherein an area of the eyebox is less than one fifth of an output area of the waveguide-based display.

8. The optical coupler of claim 1, wherein:
   each region of the plurality of regions of the slanted surface-relief grating is configured to couple display light for a respective field of view into a waveguide of the waveguide-based display and prevent coupled display light for other fields of view from being coupled out of the waveguide by the slanted surface-relief grating; and
   the display light diffracted by the different regions of the plurality of regions of the slanted surface-relief grating into the waveguide propagates at different directions within the waveguide.

9. The optical coupler of claim 1, wherein the slanted surface-relief grating is formed on a front or back surface of the waveguide-based display.

10. The optical coupler of claim 1, wherein a width of each of the plurality of regions is between 10 micrometers and 1 millimeter.

11. The optical coupler of claim 1, wherein the display light diffracted by each region of the plurality of regions of the slanted surface-relief grating has an angular range greater than 10°.

12. The optical coupler of claim 1, wherein a slant angle of the slanted surface-relief grating is greater than 30°.

13. A waveguide-based near-eye display, comprising:
a substrate; and
an output coupler including a slanted surface-relief grating formed on a surface of the substrate, the slanted surface-relief grating including a plurality of regions,
wherein different regions of the plurality of regions of the slanted surface-relief grating have at least one of different respective grating duty cycles or different respective refractive index modulations such that the different regions have different angular selectivity characteristics for incident display light; and
wherein display light for different fields of view propagates at different respective angles within the substrate and thus is diffracted by the different regions of the plurality of regions of the slanted surface-relief grating to propagate at different respective directions towards an eyebox of the waveguide-based near-eye display.

14. The waveguide-based near-eye display of claim 13, wherein:
the different regions of the plurality of regions of the slanted surface-relief grating have different grating duty cycles that range from 5% to 95%; and
a depth of the slanted surface-relief grating is greater than a threshold value.

15. The waveguide-based near-eye display of claim 14, wherein the threshold value is greater than a half of a grating period of the slanted surface-relief grating.

16. The waveguide-based near-eye display of claim 13, wherein:
the slanted surface-relief grating comprises an overcoat layer filling gaps in the slanted surface-relief grating; and
the different regions of the plurality of regions of the slanted surface-relief grating have different refractive indexes in the overcoat layer.

17. The waveguide-based near-eye display of claim 13, wherein:
the slanted surface-relief grating comprises an overcoat layer filling gaps in the slanted surface-relief grating; and
a difference between a refractive index of the overcoat layer and a refractive index of the slanted surface-relief grating is equal to or greater than 0.2.

18. The waveguide-based near-eye display of claim 13, wherein the display light diffracted by each region of the plurality of regions of the slanted surface-relief grating has an angular range greater than 10°.

19. The waveguide-based near-eye display of claim 13, further comprising:
a light source; and
an input coupler formed on the substrate and configured to couple display light from the light source into the substrate, wherein:
the input coupler includes a plurality of regions having different angular selectivity characteristics; and
each region of the plurality of regions of the input coupler is configured to couple display light within a respective angular range into the substrate.

20. A method of displaying images using a waveguide-based near-eye display, the method comprising:
diffracting, by a first region of a slanted grating coupler, only a first portion of display light out of a waveguide, the first portion of display light propagating at angles within a first angular range towards an eyebox of the waveguide-based near-eye display; and
diffracting, by a second region of the slanted grating coupler, only a second portion of display light out of the waveguide, the second portion of display light propagating at angles within a second angular range towards the eyebox of the waveguide-based near-eye display, the second angular range different from the first angular range,
wherein the first region and the second region are characterized by at least one of different respective grating duty cycles or different respective refractive index modulations.

* * * * *